(12) United States Patent
Morales et al.

(10) Patent No.: US 11,766,595 B2
(45) Date of Patent: *Sep. 26, 2023

(54) GOLF CLUB WEIGHT ATTACHMENT MECHANISMS AND RELATED METHODS

(71) Applicant: KARSTEN MANUFACTURING CORPORATION, Phoenix, AZ (US)

(72) Inventors: Eric J. Morales, Laveen, AZ (US); Martin R. Jertson, Phoenix, AZ (US); John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,711

(22) Filed: Mar. 17, 2021

(65) Prior Publication Data
US 2021/0197044 A1 Jul. 1, 2021

Related U.S. Application Data

(63) Continuation of application No. 16/595,331, filed on Oct. 7, 2019, now Pat. No. 10,960,280, which is a
(Continued)

(51) Int. Cl.
*A63B 60/00* (2015.01)
*A63B 53/04* (2015.01)
(Continued)

(52) U.S. Cl.
CPC .............. *A63B 60/00* (2015.10); *A63B 53/04* (2013.01); *A63B 53/047* (2013.01); *A63B 53/0466* (2013.01); *A63B 53/0475* (2013.01); *A63B 53/06* (2013.01); *A63B 21/00065* (2013.01); *A63B 21/06* (2013.01); *A63B 53/0408* (2020.08); *A63B 53/0412* (2020.08); *A63B 53/0433* (2020.08); *A63B 53/0462* (2020.08); *A63B 53/0487* (2013.01); *A63B 2053/0491* (2013.01); *A63B 2209/00* (2013.01);
(Continued)

(58) Field of Classification Search
CPC ..... A63B 60/00; A63B 53/04; A63B 53/0466; A63B 53/047; A63B 53/06; A63B 53/0475; A63B 53/0487; A63B 2053/0491; A63B 53/0408; A63B 53/0412; A63B 53/0433; A63B 53/0462; B23P 11/00
USPC ................................. 473/324–350, 287–292
See application file for complete search history.

(56) References Cited

U.S. PATENT DOCUMENTS 1,167,387 A 1/1916 Daniel
2,163,091 A 6/1939 Held
(Continued)

OTHER PUBLICATIONS

WO 2017/151695, "Iron-type Golf Club Head or Other Ball Striking Device", Applicant: NIKE Innovate C.V.; Inventor: Daraskavich et al; Published Sep. 8, 2017. (Year: 2017).*

*Primary Examiner* — Sebastiano Passaniti

(57) ABSTRACT

Embodiments of golf club weight attachment mechanisms are described herein. In some embodiments, a golf club head comprises a head body with an interior cavity, a shell portion, and a bracket with a weight member coupled to the bracket. In one embodiment, the bracket and the weight member can be configured to be fully contained within the interior cavity. Other examples and related methods are also described herein.

19 Claims, 17 Drawing Sheets

Related U.S. Application Data continuation of application No. 15/948,893, filed on Apr. 9, 2018, now Pat. No. 10,434,389, which is a continuation-in-part of application No. 15/862,419, filed on Jan. 4, 2018, now Pat. No. 10,265,591, which is a continuation of application No. 15/369,303, filed on Dec. 5, 2016, now Pat. No. 9,878,222, which is a continuation of application No. 14/614,175, filed on Feb. 4, 2015, now Pat. No. 9,539,475, which is a continuation of application No. 13/745,507, filed on Jan. 18, 2013, now Pat. No. 8,951,143, which is a continuation-in-part of application No. 12/762,182, filed on Apr. 16, 2010, now Pat. No. 8,449,405.

(60) Provisional application No. 61/590,228, filed on Jan. 24, 2012, provisional application No. 61/186,311, filed on Jun. 11, 2009, provisional application No. 62/483,246, filed on Apr. 7, 2017.

(51) Int. Cl.
*B23P 11/00* (2006.01)
*A63B 53/06* (2015.01)
*A63B 21/00* (2006.01)
*A63B 21/06* (2006.01)

(52) U.S. Cl.
CPC ......... *A63B 2225/64* (2013.01); *B23P 11/00* (2013.01); *Y10T 29/49826* (2015.01); *Y10T 29/49906* (2015.01); *Y10T 29/49908* (2015.01); *Y10T 29/49922* (2015.01)

(56) References Cited

U.S. PATENT DOCUMENTS

| | | | | |
|---|---|---|---|---|
| 2,846,228 | A | 8/1958 | Reach | |
| 3,606,327 | A | 9/1971 | Gorman | |
| 4,043,563 | A | 8/1977 | Churchward | |
| 4,052,075 | A | 10/1977 | Daly | |
| 4,085,934 | A | 4/1978 | Churchward | |
| 4,313,607 | A | 2/1982 | Thompson | |
| 4,630,825 | A | 12/1986 | Schmidt et al. | |
| 4,852,880 | A * | 8/1989 | Kobayashi | A63B 60/00 473/349 |
| 5,385,348 | A | 1/1995 | Wargo | |
| 5,564,705 | A * | 10/1996 | Kobayashi | A63B 60/00 473/349 |
| 5,720,673 | A | 2/1998 | Anderson | |
| 5,833,551 | A * | 11/1998 | Vincent | A63B 60/00 473/349 |
| 5,935,019 | A | 8/1999 | Yamamoto | |
| 5,938,540 | A * | 8/1999 | Lu | A63B 53/04 473/409 |
| 5,967,905 | A | 10/1999 | Nakahara et al. | |
| 6,030,295 | A | 2/2000 | Takeda | |
| 6,033,321 | A | 3/2000 | Yamamoto | |
| 6,056,649 | A | 5/2000 | Imai | |
| 6,062,988 | A | 5/2000 | Yamamoto | |
| 6,162,132 | A | 12/2000 | Yoneyama | |
| 6,203,448 | B1 | 3/2001 | Yamamoto | |
| 6,206,789 | B1 | 3/2001 | Takeda | |
| 6,306,048 | B1 | 10/2001 | McCabe et al. | |
| 6,319,149 | B1 | 11/2001 | Lee | |
| 6,379,265 | B1 | 4/2002 | Hirakawa et al. | |
| 6,409,612 | B1 | 6/2002 | Evans et al. | |
| 6,533,679 | B1 | 3/2003 | McCabe et al. | |
| 6,592,468 | B2 * | 7/2003 | Vincent | A63B 53/047 473/345 |
| 6,638,183 | B2 * | 10/2003 | Takeda | A63B 53/047 473/335 |
| 6,811,496 | B2 * | 11/2004 | Wahl | A63B 53/047 473/345 |
| 6,902,495 | B2 | 6/2005 | Pergande et al. | |
| 7,101,291 | B2 | 9/2006 | Yamamoto | |
| 7,140,976 | B2 * | 11/2006 | Chen | A63B 60/02 473/337 |
| 7,244,188 | B2 | 7/2007 | Best | |
| 7,261,643 | B2 | 8/2007 | Rice et al. | |
| 7,273,423 | B2 | 9/2007 | Imamoto | |
| 7,281,988 | B2 | 10/2007 | Hou | |
| 7,318,782 | B2 | 1/2008 | Imamoto et al. | |
| 7,396,299 | B2 * | 7/2008 | Nicolette | A63B 53/047 473/334 |
| 7,462,110 | B2 | 12/2008 | Yamamoto | |
| 7,537,528 | B2 | 5/2009 | Rice et al. | |
| 7,572,194 | B2 | 8/2009 | Yamamoto | |
| 7,637,823 | B2 | 12/2009 | Shimazaki et al. | |
| 7,651,410 | B2 | 1/2010 | Shimazaki | |
| 7,749,101 | B2 | 7/2010 | Imamoto et al. | |
| 7,775,904 | B2 | 8/2010 | Hirano | |
| 7,806,781 | B2 | 10/2010 | Imamoto | |
| 7,828,672 | B2 | 11/2010 | Billings | |
| 7,871,339 | B2 | 1/2011 | Sanchez et al. | |
| 8,206,237 | B2 * | 6/2012 | Gilbert | A63B 53/047 473/332 |
| 8,257,196 | B1 | 9/2012 | Abbott et al. | |
| 8,342,985 | B2 * | 1/2013 | Hirano | A63B 53/047 473/331 |
| 8,444,505 | B2 | 5/2013 | Beach et al. | |
| 8,449,405 | B2 | 5/2013 | Jertson et al. | |
| 8,753,219 | B2 * | 6/2014 | Gilbert | A63B 53/0475 473/291 |
| 8,840,485 | B2 * | 9/2014 | Jorgensen | A63B 53/047 473/328 |
| 8,911,302 | B1 * | 12/2014 | Ivanova | A63B 53/06 473/332 |
| 8,926,451 | B2 * | 1/2015 | Deshmukh | B21K 17/00 473/349 |
| 8,951,143 | B2 | 2/2015 | Morales et al. | |
| 9,017,186 | B2 | 4/2015 | Jertson et al. | |
| 9,089,748 | B2 | 7/2015 | Morales et al. | |
| 9,345,938 | B2 * | 5/2016 | Parsons | A63B 53/0475 |
| 9,539,475 | B2 | 1/2017 | Morales et al. | |
| 9,878,222 | B2 | 1/2018 | Morales et al. | |
| 10,265,591 | B2 | 4/2019 | Morales et al. | |
| 10,293,224 | B2 * | 5/2019 | Norimura | A63B 53/047 |
| 10,322,321 | B2 * | 6/2019 | Oldknow | A63B 53/0466 |
| 10,434,389 | B2 | 10/2019 | Morales et al. | |
| 10,960,280 | B2 * | 3/2021 | Morales | A63B 53/0475 |
| 11,135,487 | B2 * | 10/2021 | Petersen | A63B 60/54 |
| 11,173,358 | B2 * | 11/2021 | Norimura | A63B 53/047 |
| 2002/0042307 | A1 * | 4/2002 | Deshmukh | A63B 53/0466 473/335 |
| 2005/0020377 | A1 * | 1/2005 | Yang | A63B 60/00 473/335 |
| 2005/0096151 | A1 * | 5/2005 | Hou | A63B 53/04 473/335 |
| 2006/0100029 | A1 | 5/2006 | Lo | |
| 2007/0129169 | A1 * | 6/2007 | Shimazaki | A63B 53/0466 473/349 |
| 2007/0155534 | A1 * | 7/2007 | Tsai | A63B 60/02 473/335 |
| 2007/0281796 | A1 | 12/2007 | Gilbert et al. | |
| 2009/0082133 | A1 * | 3/2009 | Tseng | A63B 53/0475 427/250 |
| 2009/0149277 | A1 * | 6/2009 | Deng | A63B 60/00 219/121.64 |
| 2013/0303302 | A1 * | 11/2013 | Jorgensen | A63B 60/00 473/328 |
| 2013/0303305 | A1 | 11/2013 | Myrhum et al. | |
| 2014/0295985 | A1 * | 10/2014 | Stokke | A63B 60/00 473/291 |
| 2015/0297958 | A1 * | 10/2015 | Hebreo | A63B 53/047 473/350 |
| 2016/0243413 | A1 * | 8/2016 | Ritchie | A63B 53/047 |
| 2017/0028271 | A1 * | 2/2017 | Petersen | A63B 53/08 |
| 2018/0243619 | A1 * | 8/2018 | Ines | B21K 17/00 |
| 2018/0256947 | A1 * | 9/2018 | Mata | A63B 53/0475 |

* cited by examiner

GOLF CLUB WEIGHT ATTACHMENT MECHANISMS AND RELATED METHODS

CROSS REFERENCE TO RELATED APPLICATIONS

This is a continuation of U.S. patent application Ser. No. 16/595,331, filed Oct. 7, 2019, which is a continuation of U.S. patent application Ser. No. 15/948,893, now U.S. Pat. No. 10,434,389 filed Apr. 9, 2018, which is a continuation-in-part of U.S. patent application Ser. No. 15/862,419, now U.S. Pat. No. 10,265,591, filed Jan. 4, 2018, which is a continuation of U.S. patent application Ser. No. 15/369,303, now U.S. Pat. No. 9,878,222, filed Dec. 5, 2016, which is a continuation of U.S. patent application Ser. No. 14/614,175, now U.S. Pat. No. 9,539,475, filed Feb. 4, 2015, which is a continuation of U.S. patent application Ser. No. 13/745,507, now U.S. Pat. No. 8,951,143 filed Jan. 18, 2013, which claims the benefit of U.S. Provisional Application No. 61/590,228, filed Jan. 24, 2012, which is a continuation-in-part of U.S. patent application Ser. No. 12/762,182, now U.S. Pat. No. 8,449,405, filed Apr. 16, 2010, which claims the benefit of U.S. Provisional Application No. 61/186,311, filed Jun. 11, 2009. This further claims the benefit of U.S. Provisional Application No. 62/483,246, filed Apr. 7, 2017, the contents of all of the above-described applications are incorporated fully herein by reference.

TECHNICAL FIELD

The present disclosure related generally to sports equipment, and relates, more particularly, to golf club weight attachment mechanisms and related methods.

BACKGROUND

During the evolution of club head design for sports equipment, several strategies have been employed to manipulate or alter the physical and/or gaming characteristics of club heads. For example, golf club heads have been designed to accommodate weights that alter or adjust the distribution of mass across a body of such club heads.

The placement of such weights, however, can be problematic in some situations. For example, there can be cases where materials used to form the weights may not be compatible for proper bonding with materials used to form the body of the club head. In such cases, bonding mechanisms such as welding may not provide the structural integrity required by the bond to withstand stresses while still properly securing the weights to the club head. Using other weight materials that may be compatible for bonding with the body of the club head may lead to other problems, such as unwieldy or larger weight configurations that would be harder to accommodate within the body of the club head for proper weight distribution and/or aesthetic considerations.

Accordingly, needs exist for mechanisms and/or procedures capable of overcoming the limitations described above.

BRIEF DESCRIPTION OF THE DRAWINGS

The present disclosure may be better understood from a reading of the following detailed description of examples of embodiments, taken in conjunction with the accompanying figures.

Figure 1:
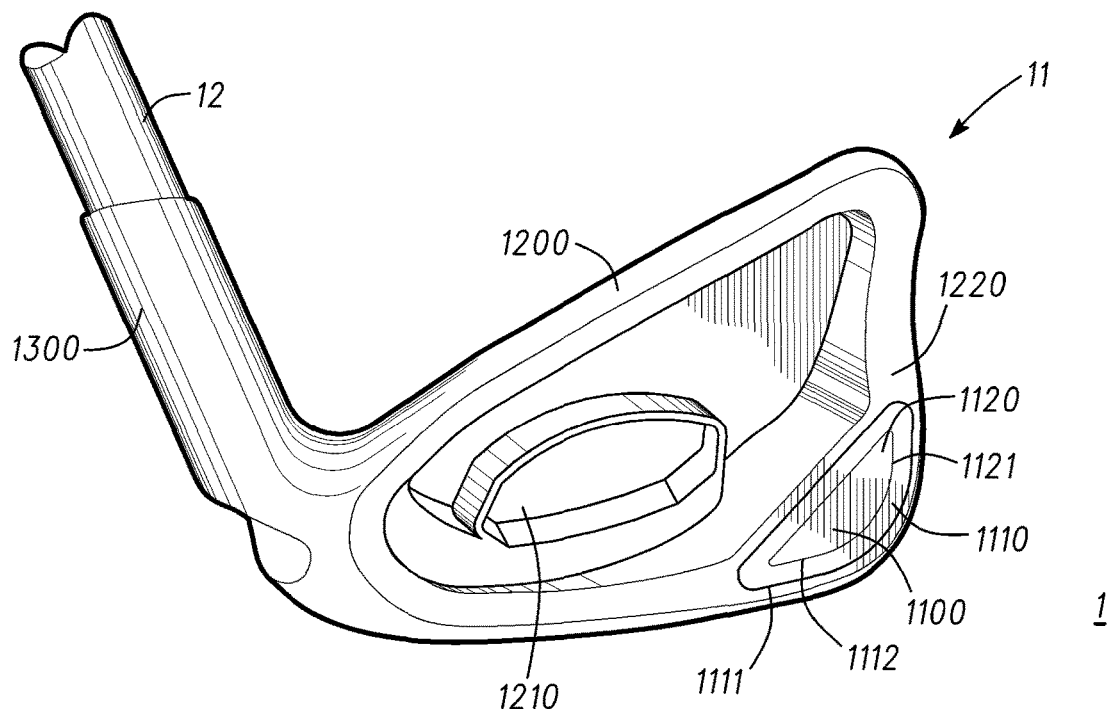
FIG. 1 illustrates a back perspective view of a club having a body and a multi-density weight.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

DESCRIPTION

Described herein is a golf club head, comprising a multi-density weight. In some embodiments, the multi-density weight can include multiple weight components. For example, the multi-density weight can comprise a first weight component and a second weight component bounded within the first weight component. The first weight component comprises a material having a low density capable of bonding with the material of the club head. The second weight component comprises a material having a higher density capable of manipulating the club head CG. In many embodiments, the second weight component of the multi-density weight can be completely bounded by the first weight component. In other embodiments, the second weight component can be partially bounded by the first weight component. The multi-density weight can form any portion of the golf club head. In some embodiments, the multi-density weight can form a portion of a toe region of the golf club head. In some embodiments, the multi-density weight can form a portion of a toe region and a rear region of the golf club head. In some embodiments, the multi-density weight can form a portion of a toe region, a sole region, and a rear region of the golf club head. In other embodiments, the multi-density weight can form a portion of a toe region and a sole region of the golf club head. Further, the first and second weight components of the multi-density weight can be formed integrally with one another using methods such as additive manufacturing or 3D printing. In other embodiments, the first and second weight components of the multi-density weight can be formed separately and then coupled together by a swedged bond, an epoxy bond, a sintered bond, and or a shrink fit bond. The multi-density weight can then be coupled to the club head body by a weld bond, a brazed bond, a compression ring, and or by pressing the multi-density weight to club head body.

Altering the mass distribution in a golf club head can move the golf club head center of gravity "CG" and in turn greatly affect the club head performance characteristics. For example, if the CG of a golf club head is positioned near the front of the club head it can result in a lower spin being induced on the ball after impact. If the CG of the club head is positioned further back on the club head it can result in a higher club head MOI resulting in a club head, which has a greater resistance to rotation during the swinging motion and greater club head forgiveness for off center hits. Including a weight in a specific location on the club head can manipulate the club head CG to optimize golf club head performance. Ideally, the weight is a high density material which can concentrate the added mass to a specific location on the club head. However, golf club heads are preferably constructed from light weight low density materials making it difficult to couple (eg. by welding) a high density weight directly to the golf club head.

In other embodiments, the multi-density weight can comprise a shell portion and a weight member coupled to the shell portion. The shell portion can comprise a material having a low density and capable of bonding with the material of the club head. The weight member can comprise a material having a higher density capable of manipulating the club head CG. In many embodiments, the weight member of the multi-density weight can be completely bounded by the shell portion. In other embodiments, the weight member can be partially bounded by the shell portion. Further, the weight member and the shell portion can be coupled together by mechanical bonds, such as a bracket, a malleable lip, encapsulating the weight member between two shell sheets, and or by casting the shell portion and injection molding the weight member within the shell. The multi-density weight can then be coupled to the golf club head by welding, or brazing the shell portion to the club head body.

In some embodiments, the golf club head can be a wood or hybrid type golf club head, wherein a wood or hybrid type club head can be a driver, a fairway wood, a hybrid or a cross-over type club head. A wood or hybrid type golf club head can have a volume within the range of 200 cc to 500 cc. In some embodiments, the wood or hybrid type golf club head can have a volume within the range of 200 cc-250 cc, 225 cc-275 cc, 250 cc-300 cc, 275 cc-325 cc, 300 cc-350 cc, 325 cc-375 cc, 350 cc-400 cc, 375 cc-425 cc, 400 cc-450 cc, 425 cc-475 cc, 450 cc-500 cc. For example, the volume of the golf club head can be 200 cc, 250 cc, 300 cc, 350 cc, 400 cc, 440 cc, 445 cc, 450 cc, 455 cc, 460 cc, 465 cc, 470 cc, 475 cc, 480 cc, 485 cc, 490 cc, 495 cc, or 500 cc. Further, the loft on a wood or hybrid type golf club head can be within the range of 5 degrees to 50 degrees. In some embodiments, the loft on a wood or hybrid type golf club head can be within the range of 5-15 degrees, 10-20 degrees, 15-25 degrees, 20-30 degrees, 25-35 degrees, 30-40 degrees, 35-45 degrees, or 40-50 degrees. For example, the golf club head can have a loft of 5 degrees, 10 degrees, 15 degrees, 20 degrees, 25 degrees, 30 degrees, 35 degrees, 40 degrees, 45 degrees, or 50 degrees.

In other embodiments, the golf club head can be an iron type golf club head. An iron type golf club head can have a volume within the range of 10 cc to 100 cc. In some embodiments, the iron type golf club head can have a volume within the range of 10 cc-30 cc, 20 cc-40 cc, 30 cc-50 cc, 40 cc-60 cc, 50 cc-70 cc, 60 cc-80 cc, 70 cc-90 cc, or 80 cc-100 cc. For example, the volume of the golf club head can be 10 cc, 20 cc, 30 cc, 40 cc, 50 cc, 60 cc, 70 cc, 80 cc, 90 cc, or 100 cc. Further, the loft of the iron type golf club head can be within the range of 10 degrees to 80 degrees. In some embodiments, the loft of the iron type golf club head can be with the range of 10-20 degrees, 15-25 degrees, 20-30 degrees, 25-35 degrees, 30-40 degrees, 35-45 degrees, 40-50 degrees, 45-55 degrees, 50-60 degrees, 55-65 degrees, 60-70 degrees, 65-75 degrees, or 70-80 degrees. For example, the golf club head can have a loft of 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, or 80 degrees.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

I) Multi-Density Weight Comprising Multiple Weight Components

In one embodiment, an apparatus can comprise a body and a multi-density weight. The multi-density weight can be 1100, 3100, 4100, 5100, 6100, 7100, or 9100. The body can comprise a receptacle at a surface of the body, where the surface of the body can be proximate to at least one of a hosel, an upper toe region, a lower toe region, a heel region, a backside region, an upper-half region, or a lower-half region of the body. The multi-density weight can comprise a first weight component comprising a first density, an inner portion and a periphery around the inner portion, and a second weight component comprising a second density different from the first density and secured along the inner portion of the first weight component. The first weight component in the respective multi-density weight can be 1110, 3110, 4110, 5110, 6110, 7110, or 9110. The second weight component in the respective multi-density weight can be 1120, 3120, 4120, 5120, 6120, 7120, or 9120. In some embodiments, a multi-density weight can comprise more than two weight components comprising different densities. The body, the first weight component, and the second weight component can comprise materials different from each other, where the second weight component can comprise a material having a weld-averse trait with respect to the body. The receptacle can comprises a receptacle base and a receptacle wall circumscribing the receptacle base, while the multi-density weight can comprise a perimeter secured along the receptacle wall.

As described below, the multi-density weight 1100, 3100, 4100, 5100, 6100, 7100, and 9100 can be coupled to any region of the club head body 1300, 1400, 1500, and 1600 respectively, depending on the type of club head involved and the desired effect upon the center of gravity, mass distribution, launch angle, hook/slide tendencies, and/or other characteristics of the club head. As described below, the multi-density weight 3100, 4100, 6100, 7100, and 9100 can be similar to the multi-density 1100 and 5100, except the multi-density weight 3100, 4100, 6100, 7100, and 9100 can comprise a different shape and/or be coupled to a different region of the club head body. The differences in shape and coupling locations are described in detailed down below.

In some embodiments, the multi-density weight 1100, 3100, 4100, 5100, 6100, 7100, and 9100 can be coupled to a lower toe region as shown in FIGS. 1, 2, 5, and 33. In some embodiments, the multi-density weight 1100, 3100, 4100, 5100, 6100, 7100, and 9100 can be coupled to a toe region, a sole region and/or a rear region of the club head body as shown in FIG. 38-43. In other embodiments, the multi-density weight 1100, 3100, 4100, 5100, 6100, and 9100 can be coupled to a sole region and a toe region of the club head body as shown in FIG. 42. The multi-density weight 1100, 3100, 4100, 5100, 6100, 7100, and 9100 can comprise a first weight component 1110, 3110, 4110, 5110, 6110, 7110, and 9110 respectively, which can be formed from a low density material and a second weight component 1120, 3120, 4120, 5120, 6120, 7120, and 9120 respectively, which can be formed from a high density material. The low and high density materials for the multi-density weight 3100, 4100, 6100, 7100, and 9100 can be similar to the materials described below for the multi-density weight 1100 and 5100. In some embodiments, the first weight component 1110, 3110, 4110, 5110, 6110, 7110, and 9110 completely bounds the second weight component 1120, 3120, 4120, 5120, 6120, 7120, and 9120 on all surfaces. In other embodiments, the first weight component 1110, 3110, 4110, 5110, 6110, 7110, and 9110 partially bounds the second weight component 1120, 3120, 4120, 5120, 6120, 7120, and 9120 on at least one surface. In many embodiments, the second weight component 1120, 3120, 4120, 5120, 6120, 7120, and 9120 can be embedded into the first weight component 1110, 3110, 4110, 5110, 6110, 7110, and 9110. The specific surfaces the first weight component bounds the second weight component are described down below in the various embodiments.

In many embodiments, the multi-density weight 1100, 3100, 4100, 5100, 6100, 7100, and 9100 can have the second weight component 1120, 3120, 4120, 5120, 6120, 7120, and 9120 comprising approximately 90% of the total volume of the multi-density weight and the first weight component 1110, 3110, 4110, 5110, 6110, 7110, and 9110 comprising approximately 10% of the total volume of the multi-density weight. In other embodiments, the second weight component 1120, 3120, 4120, 5120, 6120, 7120, and 9120 can comprise greater than 40%, greater than 50%, greater than 60%, greater than 70%, greater than 80%, greater than 90%, or greater than 95% of the total volume of the multi-density weight 1100, 3100, 4100, 5100, 6100, 7100, and 9100.

Further, the multi-density weight 3100, 4100, 6100, 7100, and 9100 can comprise a first weight component thickness 3130, 4130, 6130, 7130, and 9130 respectively, as shown in FIGS. 34, 36, 39, 41, and 43. The multi-density weight 1100 and 5100 can comprise a first weight component thickness. The first weight component thickness 3130, 4130, 6130, 7130, and 9130 can be measured from one end of the first weight component 3110, 4110, 6110, 7110, and 9110 to an adjacent end of the second weight component 3120, 4120, 6120, 7120, and 9120. In some embodiments, the first weight component thickness 3130, 4130, 6130, 7130, and 9130 can be the same. In other embodiments, the first weight component thickness 3130, 4130, 6130, 7130, and 9130 can be different from each other. In some embodiments, the first weight component thickness 3130, 4130, 6130, 7130, and 9130 can be greater than or equal to 0.075 inch, greater than or equal to 0.076 inch, greater than or equal to 0.077 inch, greater than or equal to 0.078 inch, greater than or equal to 0.079 inch, greater than or equal to 0.080 inch, greater than or equal to 0.085 inch, greater than or equal to 0.090 inch, greater than or equal to 0.095 inch, or greater than or equal to 0.10 inch.

FIGS. 33-43 illustrate exemplary embodiments of the multi-density weight 3100, 4100, 6100, 7100, and 9100 positioned within receptacles 3210, 6210, 7210, and 9210 respectively, in various locations on the golf club head body 1300, 1400, 1500, and 1600. The receptacle 2210, 3210, 6210, 7210, 9210 can comprise a recess or cutout in the golf club head body 11, 1300, 1400, 1500, 1600.

The multi-density weight 1100, 3100, 4100, 5100, 6100, 7100, 9100 can comprise various shapes and dimensional configurations. In some embodiments, the multi-density weight 1100, 3100, 4100, 5100, 6100, 7100, and 9100 can comprise a shape and dimension that is complementary to the receptacle 2210, 3210, 6210, 7210, and 9210. In other embodiments, the multi-density weight can comprise a shape and dimension that only partially fills the receptacle 2210, 3210, 6210, 7210, and 9210. In some embodiments, the multi-density weight 1100, 3100, 4100, 5100, 6100, 7100, and 9100 can couple to the receptacle along a plurality of surfaces. In other embodiments, the multi-density weight 1100 3100, 4100, 5100, 6100, 7100, and 9100 can couple to the receptacle 2210, 3210, 4210, 6210, 7210, and 9210 along any number of surfaces, such as one, two, three, four, five or six surfaces. In some embodiments, the multi-density weight 3100 and 4100 can have five surfaces bounded within the receptacle 3210 and one surface exposed to the exterior of the club head 1300. In other embodiments, the multi-density weight 6100, 7100, and 9100 can be partially bounded with four or less surfaces bounded within the receptacle 6210, 7210, and 9210 and the remaining surfaces exposed to the exterior of the club head body 1400, 1500, and 1600. The club head body 1300, 1400, 1500, and 1600 can be any iron-type golf club head such as a cavity-back iron (FIG. 33-41) capable of receiving an insert, a hollow body iron (FIG. 42 and FIG. 43), or a muscle-back iron.

A. Semi-Circular Multi-Density Weight

Figure 2:
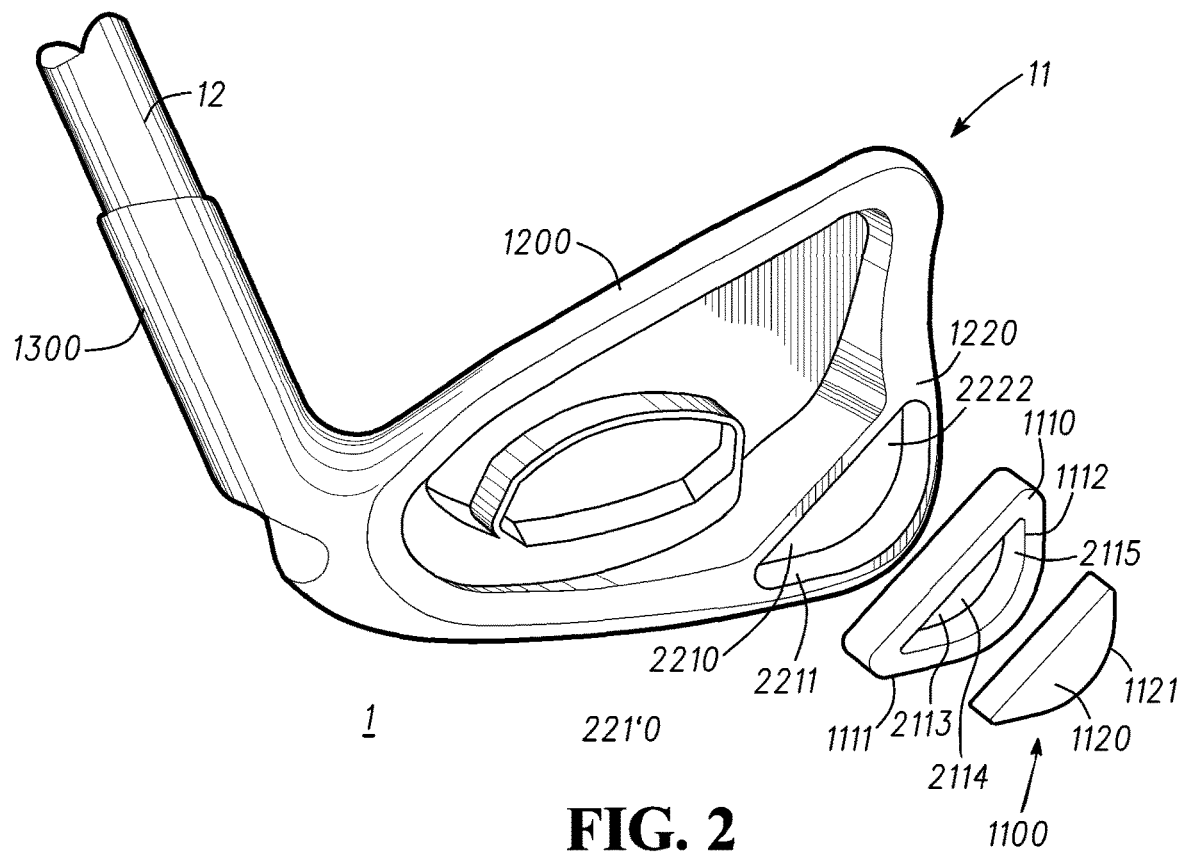
FIG. 2 illustrates an exploded back perspective view of the club of FIG. 1.
Figure 3:
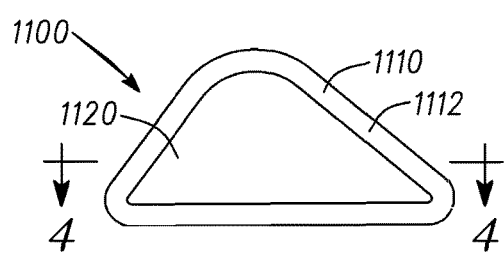
FIG. 3 presents a top view of the multi-density weight of the club of FIG. 1.
Figure 4:
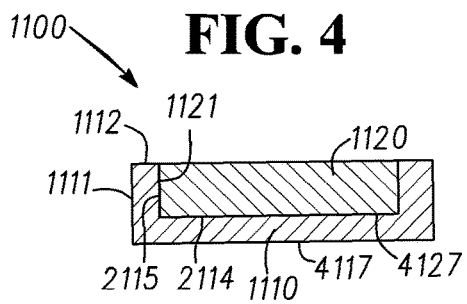
FIG. 4 shows a cross sectional view of the multi-density weight of FIG. 1, along line 4-4 of FIG. 3.

FIG. 1 illustrates a rear perspective view of club 1 having body 1200 and multi-density weight 1100. FIG. 2 illustrates an exploded rear perspective view of club 1. FIG. 3 presents a top view of multi-density weight 1100. FIG. 4 shows a cross sectional view of multi-density weight 1100 along a line 3-3 of FIG. 3.

Club 1 is illustrated in FIG. 1 as a golf club, and comprises club head 11 and shaft 12, where club head 11 comprises body 1200 and hosel 1300. Shaft 12 is coupled in the present embodiment to club head 11 via hosel 1300. In a different embodiment, shaft 12 can couple to club head 11 directly without the need of hosel 185, such as through a bore (not shown) into club head 11. Although club head 11 is illustrated herein as an iron head, it will be understood that other embodiments of the present invention can comprise a different type of golf club head, such as a putter head, a driver head, a hybrid head, and a fairway wood head, among others. The teachings in this disclosure are not limited to any specific type of club or club head.

As shown in FIGS. 1-2, multi-density weight 1100 is configured to couple with body 1200 at receptacle 2210. In some embodiments, the receptacle 2210 can be on the exterior of the club head body 1200 configured to receive the multi-density weight 1100. In other embodiments, the receptacle 2210 can be a recess, hole, or cavity into the club head body 1200 configured to receive the multi-density weight 1100. In other embodiments, the receptacle 2210 can be an entire portion or region of the club head body 1200 that is configured to receive the multi-density weight 1100. For example, the receptacle 2210 can be a void along the entire toe portion of the body 1200, or the receptacle can be a void along the entire back portion of the club head body, or the receptacle can be any portion of the club head body 1200. Although the receptacle 2210 is located proximate to a lower toe region of body 1200 in the present embodiment, other embodiments may comprise a receptacle at other regions of body 1200, such as at or proximate to an upper toe region, a hosel region, a heel region, a backside region, an upper-half region, and/or at a lower-half region of body 1200. Because multi-density weight 1100 couples to receptacle 2210, the location of receptacle 2210 at body 1200 can be decided based on intended characteristics for club 1, including a desired distribution of mass for club 1 and/or to affect launch angle, hook, or draw performance of club 1.

Multi-density weight 1100 comprises a first weight component 1110 and a second weight component 1120 in the present example, where the first weight component 1110 comprises inner portion 2113 and periphery 1112 around inner portion 2113, and where the second weight component 1120 is secured along a cavity of the inner portion of the first weight component 1110. In at least some embodiments, a density of the second weight component 1120 differs from a density of the first weight component 1110. For example, in the present embodiment, the density of the second weight component 1120 is greater than the density of the first weight component 1110. In addition, the densities of the first weight component 1110 and/or the second weight component 1120 can be greater than a density of body 1200. Such relationships between the densities of the first weight component 1110, the second weight component 1120, and/or body 1200 can be tailored to adjust or fine tune different characteristics of club 11. For example, the greater the density of the second weight component 1120 is relative to the densities of the first weight component 1110 and/or body 1200, the greater effect multiple-density weight 1100 can have in repositioning or affecting a center of gravity of club 11. In the same or a different example, where the density of the first weight component 1110 is between the densities of the second weight component 1120 and body 1200, club 11 may exhibit a more gradual and/or less abrupt transition from a portion of lower density to a portion of higher density. In the same or a different example, such relative densities and transitions between densities can be used to improve a "feel" of club 11. In different embodiments, the density of the second weight component 1120 can be greater than the density of the first weight component 1110, and both the first weight component 1110 and the second weight component 1120 can have densities greater than the density of body 1200.

In some examples, the first weight component 1110 may conform to a shape or contour of a surface section one or more of the heel, upper toe, lower toe, hosel, heel, backside, upper-half, and/or lower-half regions of body 1200, thus permitting the second weight component 1120 to also conform and/or extend across the surface section. In the same or different examples, the first weight component 1110 can extend across the surface section, and the second weight component 1120 can be located proximate to an end of the surface section. In some embodiments, top surfaces of the first weight component 1110 and the second weight component 1120 face towards an exterior of golf club head 11 when multi-density weight 1100 couples to receptacle 2210 of body 1200, as illustrated in FIG. 1. In different embodiments, the top surface of first weight component 1110 and the second weight component 1120 can face towards an interior of golf club head 11 when multi-density height 1100 couples to receptacle 2210 of body 1200. In the same or a different embodiment, the perimeter of at least one of the first weight component 1110 and/or the second weight component 1120 is non-circular such as to conform to the shape of the surface section.

In the present example, the materials of body 1200, the first weight component 1110, and the second weight component 1120 can differ from each other. For example, in some embodiments, body 1200 can comprise a metallic material or alloy such as stainless steel, carbon steel, or other types of steel. In the same or other embodiments, the material of body 1200 can comprise a density with a specific gravity of, for example, approximately 7.5 to approximately 8.5. In other embodiments, the material of the body 1200 can have a density within the range of 5-7 g/cm³, 6-8 g/cm³, 7-9 g/cm³, or 8-10 g/cm³. For example, the material of the body 1200 can have a density of less than 10 g/cm³, less than 9 g/cm³, less than 8 g/cm³, less than 7 g/cm³, less than 6 g/cm³, or less than 5 g/cm³.

In the same or a different embodiment, the first weight component 1110 can comprise a material such as a metallic alloy comprising a tungsten alloy, a tungsten-nickel alloy, and/or a copper alloy. In many embodiments, the first weight component 1100 can comprise a tungsten alloy wherein the composition comprises less than 85% tungsten. In other embodiments, wherein the first weight component 1100 comprises a tungsten alloy the composition can include less than 95, 93, 91, 89, 87, 85, 83, 81, 79, 75, or 70% tungsten. In some embodiments, wherein the first weight component 1110 comprises a tungsten-nickel alloy, the tungsten-nickel alloy can include a composition having at least 5% nickel. In other embodiments, the tungsten-nickel alloy can comprise at least 2, 3, 4, 5, 6, 7, 8, 9, 10, 15, 20, 25, or 30% nickel. Forming the first weight component 1100 from a tungsten alloy, tungsten-nickel alloy, or a copper alloy allows the first weight component 1100 to have bonding capabilities with both the lower density material of the body 1200 and the higher density material of the second weight component 1120. There can be examples where the material of the first weight component 1110 can comprise a density with a specific gravity of, for example, approximately 8 to approximately 11. In some embodiments, the material of the first weight component 1110 can have a density within the range of 7-9 g/cm³, 8-10 g/cm³, 9-11 g/cm³, 10-12 g/cm³, 11-13 g/cm³, 12-14 g/cm³, or 13-15 g/cm³. For example the density of the first weight component 1110 can be less than 15 g/cm³, less than 14 g/cm³, less than 13 g/cm³, less than 12 g/cm³, less than 11 g/cm³, less than 10 g/cm³, less than 9 g/cm³, less than 8 g/cm³, or less than 7 g/cm³.

In the same or a different embodiment, the second weight component 1120 can comprise a heavier material, such as a tungsten material, a brass material, a lead material, and/or alloys thereof, and can have a density greater than the density of the first weight component 1110, with a specific gravity of, for example, approximately 14 to approximately 20. In some embodiments, the material of the second weight component 1120 can have a density within the range of 9-12 g/cm³, 10-13 g/cm³, 11-14 g/cm³, 12-15 g/cm³, 13-16 g/cm³, 14-17 g/cm³, or 15-18 g/cm³, 16-19 g/cm³, 17-20 g/cm³, or 18-21 g/cm³. For example, the material of the second weight component 1120 can have a density greater than 9 g/cm³, greater than 10 g/cm³, greater than 11 g/cm³, 12 g/cm³, 13 g/cm³, greater than 14 g/cm³, greater than 15 g/cm³, greater than 16 g/cm³, greater than 17 g/cm³, greater than 18 g/cm³, greater than 19 g/cm³, greater than 20 g/cm³, or greater than 21 g/cm³. In embodiments wherein the material has a density of greater than 9 g/cm³, the material can be tungsten, molybdenum, palladium, uranium, silver, gold, osmium, iridium or any other metal comprising a density greater than 9 g/cm³.

In the same or other examples, a material of multi-density weight 1100 may also impart enhanced vibrational characteristics for club head 11. For instance, where a material of multi-density weight 1100, such as the material of the first weight component 1110, comprises a modulus of elasticity lower than that of a material of body 1200 of club head 11, improved impact feel may be achieved because the modulus of elasticity plays a large role in determining the mechanical vibration of the club head. In one example, the material of the first weight component 1110 comprises a tungsten-nickel alloy having a modulus of elasticity of approximately 19,500 thousand pounds per square inch (Kpsi) or 134,400 MegaPascals, while the material of body 1200 can comprise a steel material having a larger modulus of elasticity of approximately 23,000 Kpsi or 160,000 MegaPascals.

There can be embodiments where the material of the second weight component 1120 can comprise characteristics that make it unsuitable and/or more difficult to properly bond with the material of body 1200. For instance, the material of the second weight component 1120 can inherently comprise a weld-averse characteristic that can compromise the strength or durability of weld bonds between the second weight component 1120 and other materials such as the material of body 1200. As an example, if the material of the second weight component 1120 comprises tungsten, while the material of body 1200 comprises steel, then the second weight component 1120 could comprise a melting temperature of approximately 6150 degrees Fahrenheit, while body 1200 could comprise a melting temperature of approximately 2750 degrees Fahrenheit. Such large differences in melting temperatures and/or other physical characteristics may lead to undue deformation or liquefying of the material of body 1200 around a weld between body 1200 and the second weight component 1120, to such an extent that the original shape or contour of perimeter 1111 may not be maintained. In such examples, the weld-averse characteristic of the material of the second weight component 1120 relative to the material of body 1200 can comprise a propensity for deformation, brittleness, and/or cracking during or after weld-bonding.

As seen in FIG. 2, receptacle 2210 at body surface 1220 comprises receptacle base 2222 circumscribed by receptacle wall 2211. Receptacle wall 2211 also circumscribes a cavity over receptacle base 2222, where the cavity of receptacle 2210 is configured to at least partially accommodate weight 1100, and where receptacle wall 2211 is configured to secure perimeter 1111 of multi-density weight 1100.

In the present example, the first weight component 1110 comprises base 2114 and wall 2115 circumscribing inner portion 2113 over base 2114. As seen in FIGS. 2 and 4, wall 2115 can comprise an inner wall of periphery 1112 of the first weight component 1110. In addition, an outermost perimeter of periphery 1112 of the first weight component 1110 can comprise perimeter 1111 of multi-density weight 1100. Furthermore, in the present example, bottom 4117 (FIG. 4) of multi-density weight 1100 comprises a bottom of the first weight component 1110, and is abutted against receptacle base 2222 when multi-density weight 1100 couples to receptacle 2210.

The embodiment of FIGS. 1-4 also shows that perimeter 1121 of the second weight component 1120 can be secured at least partially along inner portion 2113 and/or periphery 1112 of the first weight component 1110. In the present example, bottom 4127 of the second weight component 1120 can also be abutted against base 2114 of the first weight component 1110 when the second weight component 1120 is secured at the inner portion of the first weight component 1110.

In the present and other examples, considering the weld-averse traits of the second weight component 1120, a bonding mechanism comprising at least one of a swedged bond, an epoxy bond, a sintered bond, and/or a shrink-fit bond can be used to secure perimeter 1121 and/or bottom 4127 of the second weight component 1120 to inner portion 2113, perimeter 1112, and/or base 2114 of the first weight component 1110. In other embodiments, the first weight component 1110 and the second weight component 1120 can be formed integrally with each other. For example, the multi-density weight 1100, including the first weight component 1110 and the second weight component 1120, can be formed using an additive manufacturing process also known as 3D printing. The additive manufacturing process can involve simultaneously printing both the first weight component 1110 and the second weight component 1120 to form the multi-density weight 1100. In the same or a different example, perimeter 1111 of multi-density weight 1100 can be secured along receptacle wall 2211 via at least one of a weld bond, a brazed bond, or a compression ring. In the latter case, the compression ring could be compressed between receptacle wall 2211 and perimeter 1111.

Figure 20:
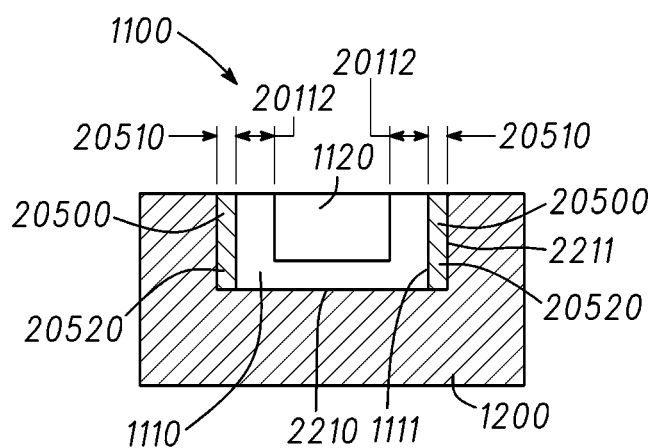
FIGS. 20 and 21 show different cross-sectional views of multi-density weights secured to receptacles in golf club bodies according to other embodiments.

In the case of a weld bond, there may be several approaches for weld bonding. Skipping ahead in the figures, FIG. 20 illustrates a cross-sectional close-up view of weight 1100 secured to receptacle 2210 of body 1200 via weld bond 20500. In the example of FIG. 20, weld gap 20510 can be allotted between receptacle wall 2211 and perimeter 1111, such as to permit insertion or seepage of welding material 20520 therebetween. Such weld gap 20510 may be as narrow as approximately 3 millimeters in some examples. Narrower weld gaps may be achieved, sometimes at a trade-off with final surface and/or cosmetic finish. In the same or other examples, wall thickness 20112 of the first weight component 1110, between perimeter 1111 and wall 2211, may be at least as thick as the weld gap to support heat dissipation and reduce permanent deformation during the welding process.

Figure 21:
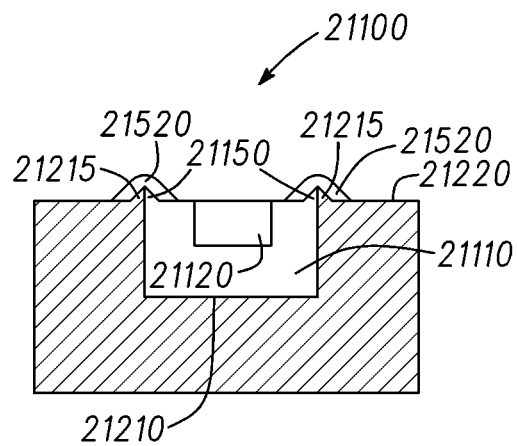

In other embodiments, a weld bond may be used without requiring a weld gap. FIG. 21 shows a cross-sectional view of weight 21100 secured to receptacle 21210 of club head body surface 21220 without the use of a weld gap. Weight 2100 can be a multi-density weight having weight components 21110 and 21120, which can be similar to the first weight component 1110 and the second weight component 1120, respectively in FIGS. 1-4. The present example comprises ridge 21150 along a top perimeter of weight 21100, and ridge 21215 along a top perimeter of receptacle 21210. The embodiment of FIG. 21 can dispense with the need for a weld gap by relying instead on welding material 21520 forming weld bond 21500 at a junction between ridges 21150 and 21215. In the present example, ridge 21150 of weight 21100 is located along a top perimeter of weight 21100, while ridge 21215 is located along a top perimeter of receptacle 21210. There may be examples, however, where ridge 21150 is not continuous along the top perimeter of weight 2100, and/or where ridge 21215 is not continuous along the top perimeter of receptacle 21210. Other embodiments may dispense with one of ridges 21150 or 21215. As an example, ridge 21150 may be directly bonded to body surface 21220 with welding material 21520 if ridge 21215 were absent from the top perimeter of receptacle 21210. In another example, ridge 21215 may be directly bonded to weight 21100 with welding material 21520 if ridge 21150 were absent from the top perimeter of weight 21100. Although the application of welding material 21520 may leave a rough or protruded salient at the interface between weight 21100 and club head body surface 21220, such salient may be removed or otherwise blended in via a subsequent grinding, polishing, or other machining process if desired. There can be embodiments where one or more of ridges 21150 and/or 21215 may be referred to as a bead, and/or where the shape of thereof differs from that illustrated in FIG. 21. If desired, there can also be embodiments where a weld gap can be used in combination with ridges 21150 and/or 21215. There can also be examples where ridges can be used to secure other portions of weight 21100. For example, weight components 21120 and 21110 can be secured together using ridges similar to ridges 21215 and/or 21150 as described above with respect to weight 21100 and body surface 21220.

Figure 6:
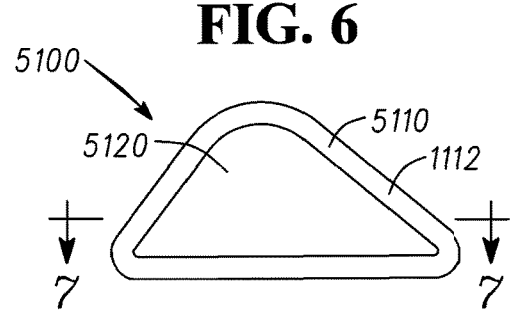
FIG. 6 presents a top view of the multi-density weight of the club of FIG. 5.
Figure 7:
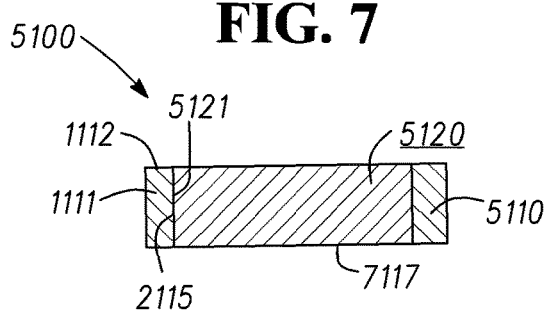
FIG. 7 shows a cross sectional view of the multi-density weight of FIG. 5, along line 7-7 of FIG. 6.
Figure 5:
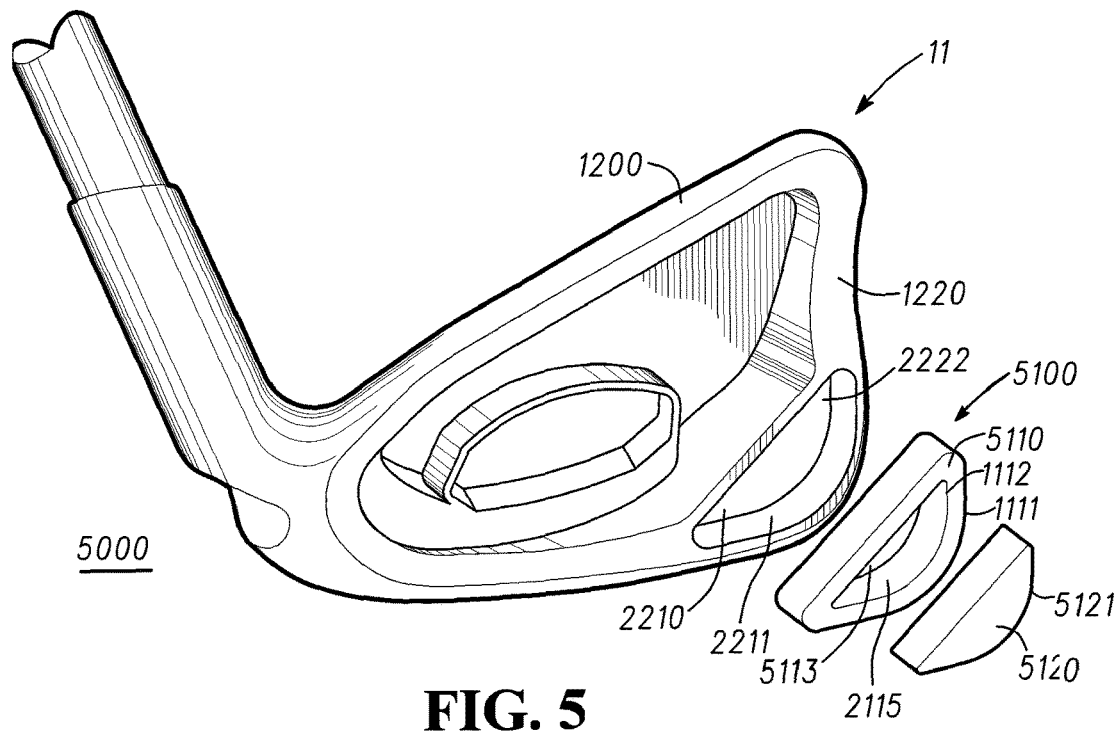
FIG. 5 illustrates a back perspective exploded view of another club having a body and a multi-density weight.

Backtracking through the figures, FIG. 5 illustrates a front perspective exploded view of club 50 having body 1200 and multi-density weight 5100. FIG. 6 presents a top view of multi-density weight 5100. FIG. 7 shows a cross sectional view of multi-density weight 1100 along a line 6-6 of FIG. 6. Club head 50 is similar to club head 10 (FIGS. 1-4), comprising multi-density weight 5100 similar to multi-density weight 1100 (FIGS. 1-4), but differing in that the first weight component 5110 of multi-density weight 5100 comprises no base similar to base 2114 of the first weight component 1110 (FIG. 2). Multi-density weight 5100 also comprises the second weight component 5120 and, because the first weight component 5110 comprises no base 2114 (FIG. 2), the second weight component 5120 can reach bottom 7117 of multi-density weight 5100 when secured at inner portion 5113 of the first weight component 5110. In the same or a different embodiment, the bottom of the second weight component 5120 can contact base 2114 of receptacle 2210 when multi-density weight 5100 is secured to body 1200. In the same or a different embodiment, because the first weight component 5110 comprises no base 2114 (FIG. 2), the bonding mechanism between the first weight component 5110 and the second weight component 5120 is more focused on securing perimeter 5121 of the second weight component 5120 at least partially along wall 2115 of the second weight component 5120.

Figure 8:
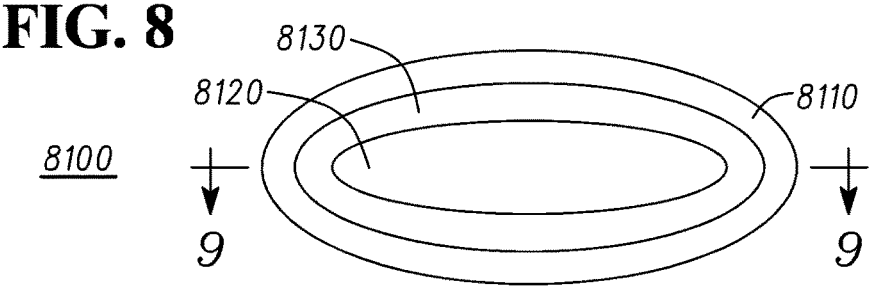
FIG. 8 presents a top view of a multi-density weight.
Figure 9:
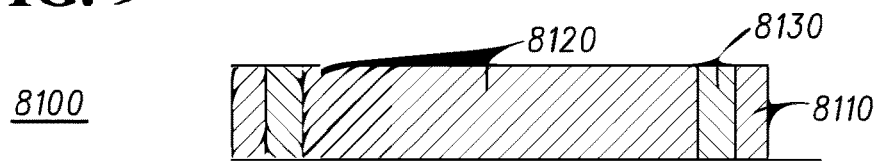
FIG. 9 shows a cross sectional view of the multi-density weight of FIG. 8, along line 9-9 of FIG. 8.

FIG. 8 presents a top view of multi-density weight 8100. FIG. 9 shows a cross sectional view of multi-density weight 8100 along a line 8-8 of FIG. 8 Multi-density weight 8100 is similar to multi-density weights 1100 (FIGS. 1-4) and 5100 (FIGS. 5-7), but comprises a first weight component 8110, a second weight component 8120, and a third weight component 8130, rather than only two weight components. There can be other implementations where multi-density weight 8100 could comprise abutted bases and bottoms of the first weight component 8110, the second weight component 8120, and/or the third weight component 8130. For example, a bottom of the second weight component 8120 could be abutted against a base of the third weight component 8130. In the same or another example, a bottom of the third weight component 8130 can be abutted against a base of the first weight component 8110. In another example, the bottoms of both the second weight component 8120 and the third weight component 8130 can be abutted against the base of the first weight component 8110. Other combinations and/or permutations are similarly possible.

In the present example, multi-density weight 8100 also comprises a shape different than the shape of multi-density weights 1100 or 5100. As a result, multi-density weight could be coupled at another receptacle different than receptacle 2210 (FIG. 2), such as at receptacle 1210 (FIG. 1), at another region of body 1200, or to another club different than club 1 (FIGS. 1-2).

The first weight component 8110, the second weight component 8120, and the third weight component 8130 comprise materials different from each other, in the present embodiment, and could be arranged, for example, to gradually transition from least dense to most dense, or vice versa. In the same or a different example, the second weight component 8120 can comprise weld-averse traits similar to those of the second weight component 1120 (FIGS. 1-4), and could be secured using one of the bonding mechanisms described above with respect to for the second weight component 1120. The first weight component 8110 can comprise a material that is suitable for welding in the present example, and could be secured using one of the mechanisms described above for first weight component 1110 (FIGS. 1-4). In some examples, the third weight component 8130 could also comprise some of the weld-averse traits of the second weight component 8120.

Figure 33:
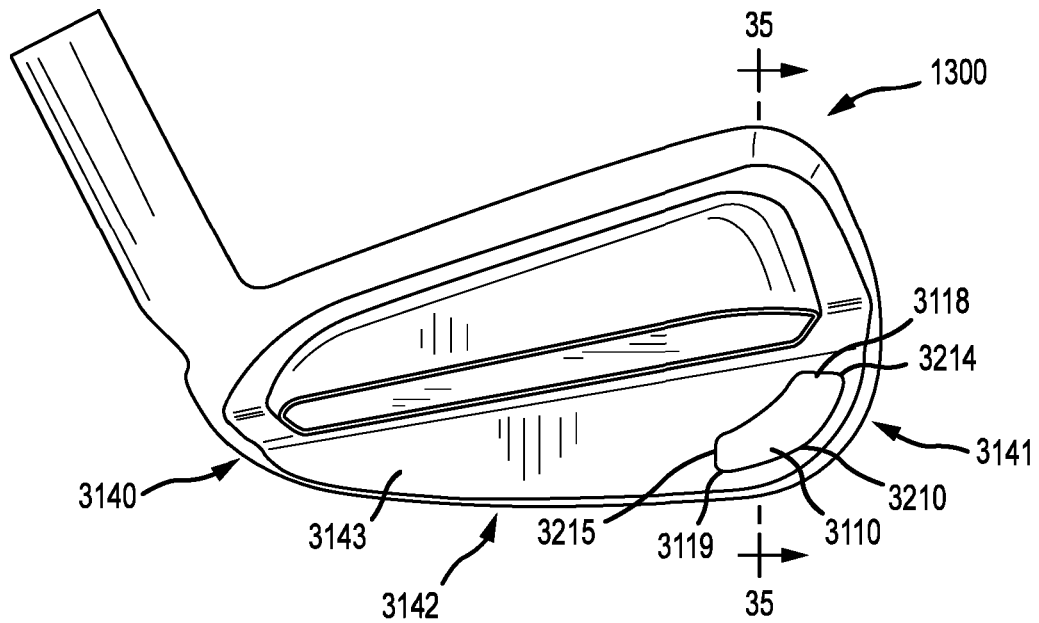
FIG. 33 illustrates a rear view of a golf club head with a multi-density weight within a receptacle.
Figure 34:
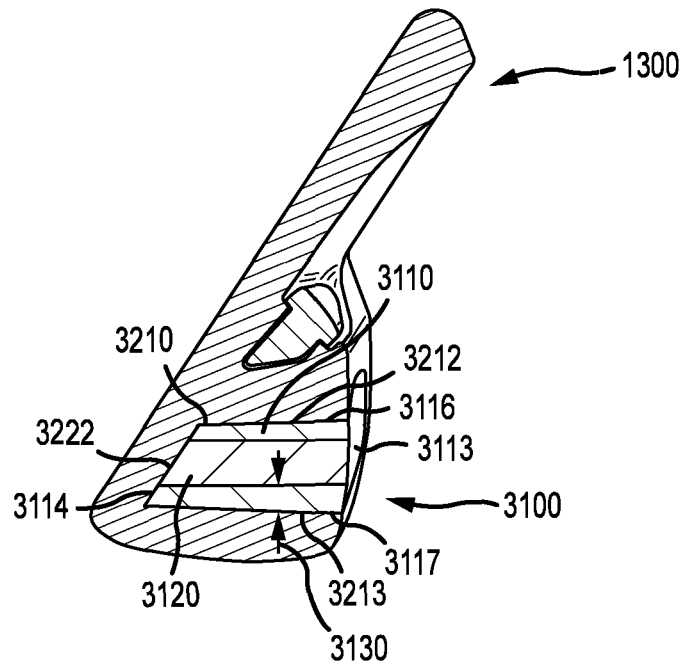
FIG. 34 illustrates the golf club head with the multi-density weight within the receptacle of FIG. 33 along a cross-sectional line 35-35.

B. Kidney-Bean Shaped Multi-Density Weight with Second Weight Component Embedded within the First Weight Component FIG. 33 illustrates an embodiment of a club head body 1300 having a receptacle 3210 that can be capable of receiving a multi-density weight 3100 and 4100 (FIGS. 34-37). FIG. 34 illustrates a cross-sectional view of the club head body 1300 of FIG. 33 along a cross-sectional line 35-35. The club head body 1300 can comprise a heel region 3140, a toe region 3141 opposite the heel region 3140, a sole region 3142, and a rear region 3143. As illustrated in FIG. 33 and FIG. 34, the club head body 1300 can comprise a top wall 3212, a bottom wall 3213, a toe side wall 3214, a heel side wall 3215, and a receptacle base 3210 positioned within an interior surface of the club head body 1300. The top wall 3212, the bottom wall 3213, the toe side wall 3214, and the heel side wall 3215, the receptacle base 3222 together form the receptacle 3210. In the illustrated embodiment, the receptacle 3210 can extend inward or cut into the rear region 3143 of the club head body 1300. The top wall 3212, the bottom wall 3213, the toe side wall 3214, and the heel side wall 3215, and a receptacle base 3222 can be configured to secure the multi-density weight 3100 and 4100 within the club head body 1300. The receptacle 3210 can form a portion of the rear region 3143 of the club head body 1300. In many embodiments, the receptacle 3210 can comprise 5 to 100% of the rear region 3143 of the club head body 1300. In some embodiments, the receptacle 3210 can comprise 5 to 25%, 25 to 50%, 50 to 75%, or 75 to 100% of the rear region 3143 of the club head body 1300. For example, the receptacle 3210 can comprise 5%, 10%, 15%, 20%, 25%, 30%, 35%, 40%, 45%, 50%, 55%, 60%, 65%, 70%, 85%, 90%, 95%, or 100% of the rear region 3143 of the club head body 1300. Further, in many embodiments, the bottom wall 3213 of the receptacle 3210 can have a curvature that follows the contour of the toe region 3141 of the club head body 1300. In other embodiments, the receptacle 3210 can have a circular, a triangular, a rectangular, a trapezoidal, a ovular, a polygonal, a kidney-bean, a peanut, or any other suitable shape contour. In the exemplary embodiment, the top wall 3212, the bottom wall 3213, the toe side wall 3214, and the heel side wall 3215 of the receptacle 3210 can form a general kidney-bean shape.

Figure 35:
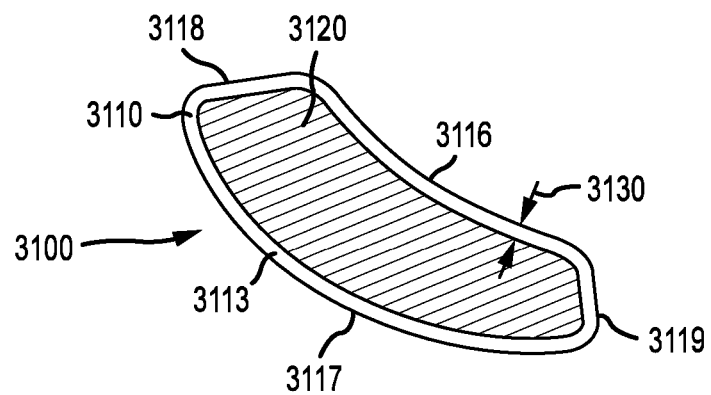
FIG. 35 illustrates a base surface of the multi-density weight configured to couple with the receptacle base of an interior surface of the golf club head in FIG. 34.

FIG. 35 illustrates a surface of the multi-density weight 3100 that can couple to the receptacle base 3222 of the club head body 1300. The multi-density weight 3100 illustrated in FIGS. 34 and 35 is similar to the multi-density weight 1100 displayed in FIGS. 3 and 4, except it has a general kidney-bean shape. In many embodiments, the multi-density weight 3100 can follow the contour of the toe region 3141 to match the general shape of the toe region 3141 of the club head body 1300. In many embodiments, the multi-density weight 3100 can comprise a first weight component 3110 and a second weight component 3120. In many embodiments, the multi-density weight 3100 can include a top surface 3113 comprising the first weight component 3110, a base 3114 comprising a portion of the first weight component 3110 and a portion of the second weight component 3120, a top wall 3116, a bottom wall 3117, a toe side wall 3118, and a heel side wall 3119. In many embodiments, the top wall 3116, the bottom wall 3117, the toe side wall 3118, and the heel side wall 3119 can comprise the first weight component 3110.

When the multi-density weight 3100 is received within the receptacle 3210, the top wall 3116 can be configured to couple or abut with the top wall 3212 of the receptacle 3210, the bottom wall 3117 can be configured to couple or abut with the bottom wall 3213 of the receptacle 3210, the toe side wall 3118 can be configured to couple or abut with the toe side wall 3214 of the receptacle 3210, and the heel side wall 3119 can be configured to couple or abut with the heel side wall 3215 of the receptacle 3210. Further, in many embodiments, the multi-density weight 3100 can be inserted in the receptacle 3210 such that the top surface 3113 of the multi-density weight 3100, illustrated in FIG. 34, can be viewed from the exterior of the club head body 1300, while the base 3114 of the multi-density weight 3100, illustrated in FIG. 35, can be coupled or abutted against the receptacle base 3222 of the club head body 1300. In the illustrated embodiment, the multi-density weight 3100 can be shaped and sized to entirely fill the receptacle 3210. In other embodiments, the multi-density weight 3100 can be shaped and sized to partially fill the receptacle 3210. The multi-density weight 3100 when received within the receptacle 3210 can comprise 5 to 100% of the rear region 3143 of the club head body 1300. In some embodiments, the multi-density weight 3100 can comprise 5 to 25%, 25 to 50%, 50 to 75%, or 75% to 100% of the rear region 3143 of the club head body 1300. For example, the multi-density weight 3100 can comprise 5%, 10%, 15%, 20%, 25%, 30%, 35%, 40%, 45%, 50%, 55%, 60%, 65%, 70%, 85%, 90%, 95%, or 100% of the rear region 3143 of the club head body 1300.

Figure 36:
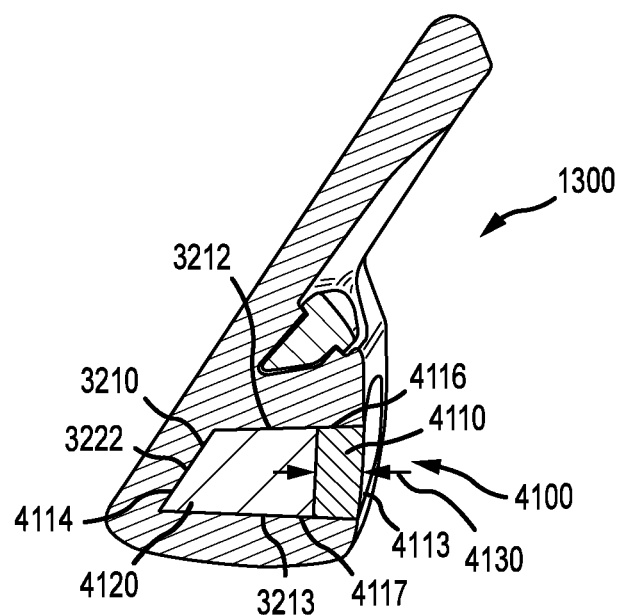
FIG. 36 illustrates a cross section of another embodiment of a multi-density weight within the receptacle on the golf club head of FIG. 33 along the cross-sectional line 35-35.
Figure 37:
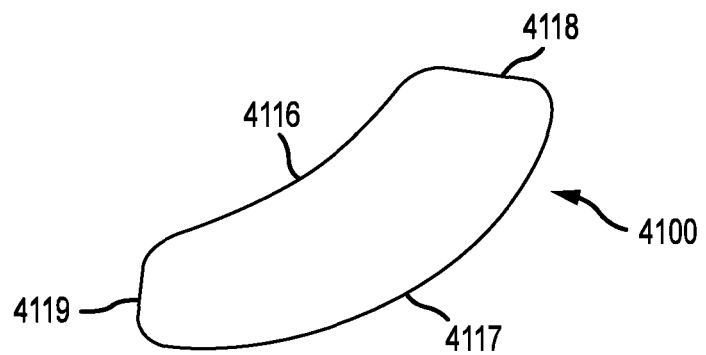
FIG. 37 illustrates a rear view of the multi-density weight of FIG. 36.

C. Kidney-Bean Shaped Multi-Density Weight with Second Weight Component Adjacent to the First Weight Component As illustrated in FIG. 36, a multi-density weight 4100 can be configured to couple with the receptacle 3210. In many embodiments, the multi-density weight 4100 can comprise a first weight component 4110 and a second weight component 4120. The multi-density weight 4100 can be similar to multi-density weight 1100 and 3100, except the first weight component 4110 does not have to completely bound the second weight component 4120. In the exemplary embodiment, the first weight component 4110 and the second weight component 4120 can be configured to couple or abut together with one surface. The second weight component 4120 does not have to be embedded within the first component 4110. The multi-density weight 4100 can comprise a top surface 4114 comprising the first weight component 4110, a base 4113 comprising the second weight component 4120, a top wall 4116, a bottom wall 4117, a toe side wall 4118, and a heel side wall 4119. In many embodiments, the top wall 4116, the bottom wall 4117, the toe side wall 4118, and the heel side wall 4119 can comprise the first weight component 4110 and the second weight component 4120.

Figure 11:
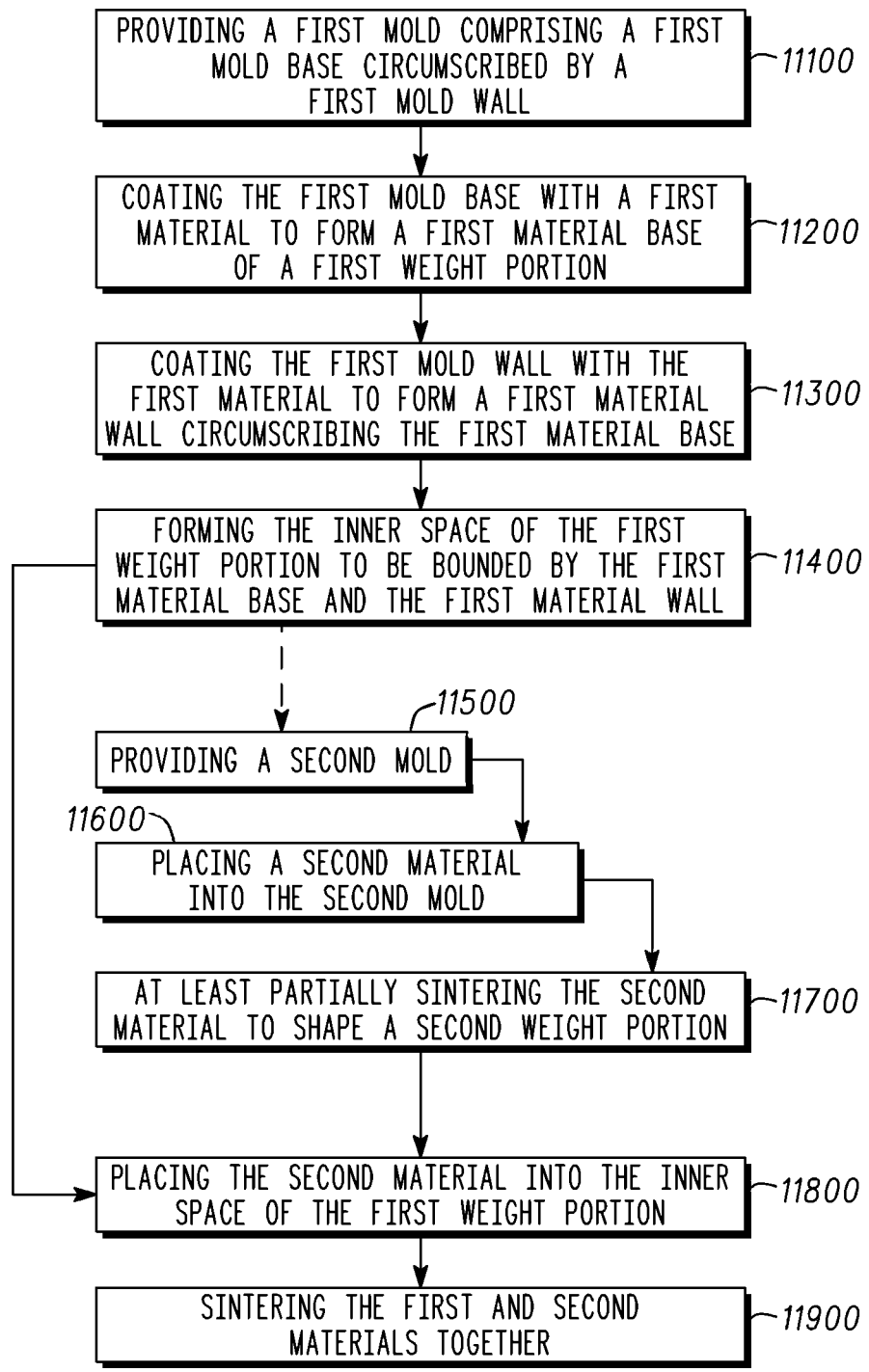
FIG. 11 illustrates a flowchart of a method for sintering in accordance with one example of the method of FIG. 10.
Figure 12:
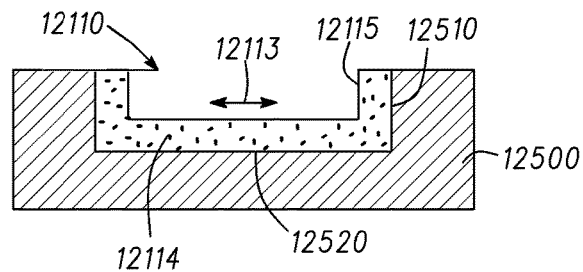
FIG. 12 illustrates a cross section of a mold used to form a weight portion of a multi-density weight.
Figure 13:
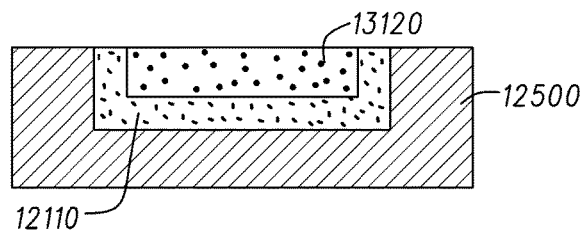
FIG. 13 illustrates a cross section of the mold of FIG. 12 used to form another weight portion of the multi-density weight of FIG. 12.

The multi-density weight 4100 can be formed using a similar method as illustrated in FIG. 11 to form the multi-density weight illustrated in FIGS. 12-13, except that, as discussed above, the first weight component 4110 is only sintered to a single surface of second weight component 4120. In other embodiments, the first weight component 4110 can be coupled via a brazed bond or a weld bond to a single surface of the second weight component 4120. The multi-density weight 4100 can be inserted or swedged into the receptacle 3210, such that the second weight component 4120 is abutted against the receptacle base 3222.

When the multi-density weight 4100 is received within the receptacle 3210, the top wall 4116 can be configured to couple or abut with the top wall 3212 of the receptacle 3210, the bottom wall 4117 can be configured to couple or abut with the bottom wall 3213 of the receptacle 3210, the toe side wall 4118 can be configured to couple or abut with the toe side wall 3214 of the receptacle 3210, and the heel side wall 4119 can be configured to couple or abut with the heel side wall 3215 of the receptacle 3210. Further, in many embodiments, the multi-density weight 4100 can be inserted to the receptacle 3210 such that the top surface 4113 of the multi-density weight 4100, illustrated in FIGS. 36 and 37, can be viewed from the exterior of the club head 1300, while the base 4114 of the multi-density weight 4100 can be coupled or abutted against the receptacle base 3222. In the illustrated embodiment, the multi-density weight 4100 can be shaped and sized to entirely fill the receptacle 3210. In other embodiments, the multi-density weight 4100 can be shaped and sized to partially fill the receptacle 3210. The multi-density weight 4100 when received within the receptacle 3210 can comprise 5 to 100% of the rear region 3143 of the club head body 1300. In some embodiments, the multi-density weight 4100 can comprise 5 to 25%, 25 to 50%, 50 to 75%, or 75% to 100% of the rear region 3143 of the club head body 1300. For example, the multi-density weight 4100 can comprise 5%, 10%, 15%, 20%, 25%, 30%, 35%, 40%, 45%, 50%, 55%, 60%, 65%, 70%, 85%, 90%, 95%, or 100% of the rear region 3143 of the club head body 1300.

In many embodiments, the top wall 4116, the bottom wall 4117, the toe side wall 4118, and the heel side wall 4119 can be configured to couple with the top wall 3212 of the receptacle 3210, the bottom wall 3213 of the receptacle 3210, the toe side wall 3214 of the receptacle 3210, and the heel side wall 3215 respectively, such that the first weight component 4110 can extend partially outward from the receptacle 3210 of the club head body 1300. In some embodiments, the multi-density weight 4100 can be secured to the receptacle 3210 by swedging similar to the multi-density weight 14100 illustrated in FIG. 14. In other embodiments, the multi-density weight 4100 can be secured to the receptacle 3210 by swedging and can include barbing elements similar to the multi-density weight 15100 illustrated in FIG. 15. In other embodiments, the multi-density weight 4100 can be secured to the receptacle 3210 by using compression elements similar to the multi density weight 16100 of FIGS. 16 and 17. In other embodiments, the first weight component 4110 can be welded to the top wall 3212, the bottom wall 3213, the toe side wall 3214, and the heel side wall 3215 of the receptacle 3210 similar to the multi-density weight 1100 and 21100 of FIGS. 20 and 21. Once the multi-density weight 4100 has been secured to the receptacle 3210, the portion of the first weight component 4110 extending partially outward from the club head body 1300 can be removed (eg. by polishing) such that the multi-density weight 4100 follows the contour of the surface of the club head body 1300.

Figure 38:
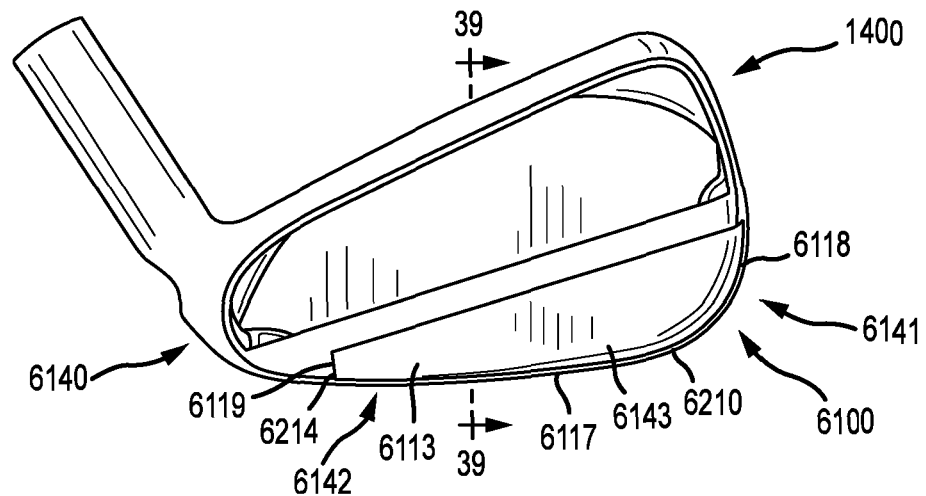
FIG. 38 illustrates a rear view of another embodiment of a golf club head with a multi-density weight within a receptacle.
Figure 39:
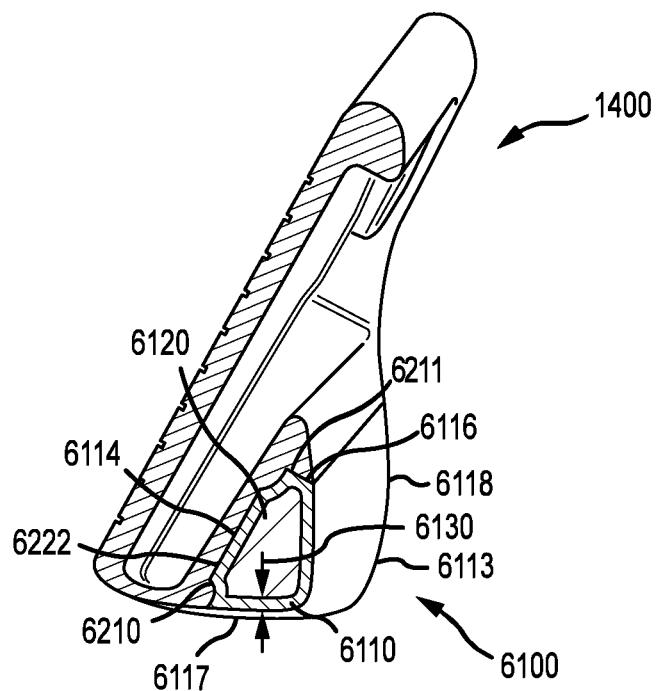
FIG. 39 illustrates the golf club head with the multi-density weight within the receptacle of FIG. 38 along a cross-sectional line 39-39.

D. Multi-Density Weight Forming More of the Rear Region and Sole Region of Golf Club Head Body FIG. 38 and FIG. 39 illustrates a club head body 1400 having a receptacle 6210 that can be capable of receiving a multi-density weight 6100. The multi-density weight 6100 can be similar to the multi-density weight 1100, 3100, and 4100 described above. The club head body 1400 can comprise a heel region 6140, a toe region 6141 opposite the heel region 6140, a sole region 6142, and a rear region 6143. In many embodiments, the club head body 1400 can comprise a receptacle base 6222, a receptacle heel side wall 6214, and a receptacle top wall 6211. The receptacle base 6222, the receptacle heel side wall 6214, and the receptacle top wall 6211 of the club head body 1400 together form the receptacle 6210. The receptacle base 6222, the receptacle heel side wall 6214, and the receptacle top wall 6211 can be configured to secure the multi-density weight 6100 within the club head body 1400.

In many embodiments, the receptacle 6210 can comprise a portion of the rear region 6143, a portion of the toe region 6141, and/or a portion of the sole region 6142 of the club head body 1400. In many embodiments, the receptacle 6210 can comprise 5 to 100% of the rear region 3143 of the club head body 1400. In some embodiments, the receptacle 6210 can comprise 5 to 25%, 25 to 50%, 50 to 75%, or 75% to 100% of the rear region 3143 of the club head body 1400. For example, the receptacle 6210 can comprise 5%, 10%, 15%, 20%, 25%, 30%, 35%, 40%, 45%, 50%, 55%, 60%, 65%, 70%, 85%, 90%, 95%, or 100% of the rear region 3143 of the club head body 1400.

In many embodiments, the receptacle 6210 can comprise 5 to 100% of the toe region 6141 of the club head body 1400. In some embodiments, the receptacle 6210 can comprise 5 to 25%, 25 to 50%, 50 to 75%, or 75% to 100% of the toe region 6141 of the club head body 1400. For example, the receptacle 6210 can comprise 5%, 10%, 15%, 20%, 25%, 30%, 35%, 40%, 45%, 50%, 55%, 60%, 65%, 70%, 85%, 90%, 95%, or 100% of the toe region 6141 of the club head body 1400.

In many embodiments, the receptacle 6210 can comprise 5 to 100% of the sole region 6142 of the club head body 1400. In some embodiments, the receptacle 6210 can comprise 5 to 25%, 25 to 50%, 50 to 75%, or 75% to 100% of the sole region 6142 of the club head body 1400. For example, the receptacle 6210 can comprise 5%, 10%, 15%, 20%, 25%, 30%, 35%, 40%, 45%, 50%, 55%, 60%, 65%, 70%, 85%, 90%, 95%, or 100% of the sole region 6142 of the club head body 1400.

In many embodiments, the receptacle 6210 can follow the contour of the toe region 6141, the sole region 6142, and the rear region 6143. The receptacle 6210 can form more of the rear region 6143 and the sole region 6142 than the toe region 6141. In other embodiments, the receptacle 6210 can be void of the receptacle heel side wall 6214 and/or the receptacle top wall 6211 and comprise solely the receptacle base 6222. In these embodiments, the receptacle 6210 can follow the contour of the toe region 6141, the heel region 6140, the sole region 6142, and the rear region 6143. In these embodiments, the receptacle base 6222 extends the entire length of the club head body 1400 in the heel to toe direction.

FIG. 39 illustrates a cross-sectional view taken along line 39-39 of FIG. 39 showing the club head body 1400 comprising a multi-density weight 6100 that can be configured to coupled with receptacle 6210. In many embodiments, the multi-density weight 6100 can comprise a first weight component 6110 and a second weight component 6120. In many embodiments, the multi-density weight 6100 can include a top surface 6113, a base 6114, a top wall 6116, a sole wall 6117, a toe side wall 6118, and a heel side wall 6119. In many embodiments, the base 6114, the top wall 6116, the sole wall 6117, the toe side wall 6118, and the heel side wall 6119 can comprise the first weight component 6110. In other embodiments, the base 6114 can comprise a portion of the first weight component 6110 and the second weight component 6120.

When the multi-density weight 6100 is received within the receptacle 6210, the base 6114 of the multi-density weight 6100 can be configured to couple or abut with the receptacle base 6222, the top wall 6116 can be configured to couple or abut with the receptacle top wall 6211 of the receptacle 6210, the sole wall 6117 of the multi-density weight 6100 can be configured to form a portion of the sole region 6142 of the club head body 1400, the toe side wall 6118 of the multi-density weight 6100 can be configured to form a portion of the toe region 6141 of the club head body 1400, and the heel side wall 6119 can be configured to couple or abut with the heel side wall 6214 of the receptacle 6210. Further, in many embodiments, the multi-density weight 6100 can be inserted in the receptacle 6210 such that the top surface 6113 of the multi-density weight 6100, illustrated in FIGS. 38 and 39, can be viewed from the exterior of the club head 1400, while the base 6114 of the multi-density weight 6100 can be coupled or abutted against the receptacle base 6222. In the illustrated embodiment, the multi-density weight 6100 can be shaped and sized to entirely fill the receptacle 6210. In other embodiments, the multi-density weight 6100 can be shaped and sized to partially fill the receptacle 6210. The multi-density weight 6100 when received within the receptacle 6210 can comprise 5 to 100% of the rear region 6143 of the club head body 1300. In some embodiments, the multi-density weight 6100 can comprise 5 to 25%, 25 to 50%, 50 to 75%, or 75% to 100% of the rear region 6143 of the club head body 1400. For example, the multi-density weight 6100 can comprise 5%, 10%, 15%, 20%, 25%, 30%, 35%, 40%, 45%, 50%, 55%, 60%, 65%, 70%, 85%, 90%, 95%, or 100% of the rear region 6143 of the club head body 1400.

In many embodiments, the multi-density weight 6100 when received within the receptacle 6210 can comprise 5 to 100% of the toe region 6141 of the club head body 1400. In some embodiments, the multi-density weight 6100 can comprise 5 to 25%, 25 to 50%, 50 to 75%, or 75% to 100% of the toe region 6141 of the club head body 1400. For example, the multi-density weight 6100 can comprise 5%, 10%, 15%, 20%, 25%, 30%, 35%, 40%, 45%, 50%, 55%, 60%, 65%, 70%, 85%, 90%, 95%, or 100% of the toe region 6141 of the club head body 1400.

In many embodiments, the multi-density weight 6100 when received within the receptacle 6210 can comprise 5 to 100% of the sole region 6142 of the club head body 1400. In some embodiments, the multi-density weight 6100 can comprise 5 to 25%, 25 to 50%, 50 to 75%, or 75% to 100% of the sole region 6142 of the club head body 1400. For example, the multi-density weight 6100 can comprise 5%, 10%, 15%, 20%, 25%, 30%, 35%, 40%, 45%, 50%, 55%, 60%, 65%, 70%, 85%, 90%, 95%, or 100% of the sole region 6142 of the club head body 1400.

The multi-density weight 6100 can be coupled to the receptacle 6210 by a weld bond or a brazed bond between the top wall 6116, the heel side wall 6119, the base 6114 of the multi-density weight 6100 and the receptacle base 6222, the receptacle top wall 6211, and the receptacle heel side wall 6214 of the receptacle 6210. In some embodiments, the receptacle 6210 can be void of a receptacle heel side wall 6214 and comprise solely a receptacle base 6222 (not shown). In these embodiments, the multi-density weight 6100 can comprise the entire rear region 6143 the club head body 1400.

Figure 40:
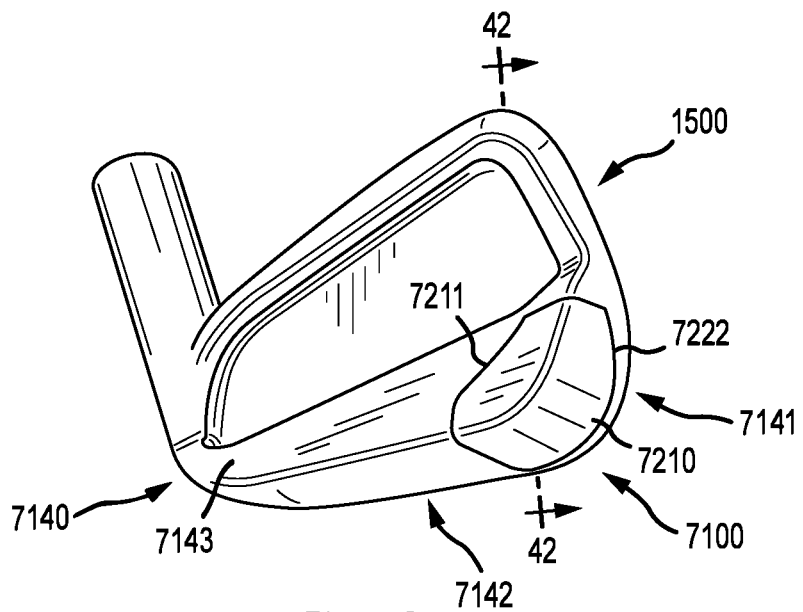
FIG. 40 illustrates a perspective view of another embodiment of a golf club head with a multi-density weight within a receptacle.

E. Multi-Density Weight Forming More of the Toe Region of the Golf Club Head Body FIG. 40 illustrates a club head body 1500 having a receptacle 7210 that can be configured to receive a multi-density weight 7100. The club head body 1500 can comprise a heel region 7140, a toe region 7141, a sole region 7142, and a rear region 7143. In many embodiments, the club head body 1500 can comprise a receptacle side wall 7211 and a receptacle base 6222. The receptacle base 7222 and the receptacle side wall 7211 together form the receptacle 7210.

The receptacle 7210 can comprise a portion of the rear region 7143, the toe region 7141, and the sole region 7142 of the club head body 1500.

In many embodiments, the receptacle 7210 can comprise 5 to 50% of the rear region 7143 of the club head body 1500. In some embodiments, the receptacle 7210 can comprise 5 to 10%, 10 to 20%, 20 to 30%, 30 to 40%, or 40 to 50% of the rear region 7143 of the club head body 1500. For example, the receptacle 7210 can comprise 5%, 10%, 15%, 20%, 25%, 30%, 35%, 40%, 45%, or 50% of the rear region 7143 of the club head body 1500.

In many embodiments, the receptacle 7210 can comprise 5 to 50% of the toe region 7141 of the club head body 1500. In some embodiments, the receptacle 7210 can comprise 5 to 10%, 10 to 20%, 20 to 30%, 30 to 40%, or 40 to 50% of the toe region 7141 of the club head body 1500. For example, the receptacle 7210 can comprise 5%, 10%, 15%, 20%, 25%, 30%, 35%, 40%, 45%, or 50% of the toe region 7141 of the club head body 1500.

In many embodiments, the receptacle 7210 can comprise 5 to 50% of the sole region 7142 of the club head body 1500. In some embodiments, the receptacle 7210 can comprise 5 to 10%, 10 to 20%, 20 to 30%, 30 to 40%, or 40 to 50% of the sole region 7142 of the club head body 1500. For example, the receptacle 7210 can comprise 5%, 10%, 15%, 20%, 25%, 30%, 35%, 40%, 45%, or 50% of the sole region 7142 of the club head body 1500.

In many embodiments, the receptacle 7210 can form more of the toe region 7141 than the rear region 7143 and/or the sole region 7142. The receptacle 7210 can follow the contour of the toe region 7141 to allow the multi-density weight 7100 to be flush with the club head body 1500. In some embodiments, the receptacle 7210 can form more of the rear region 7143 than the toe region 7141 and/or the sole region 7142. In some embodiments, the receptacle 7210 can form more of the sole region 7142 than the toe region 7141 and/or the rear region 7143.

Figure 41:
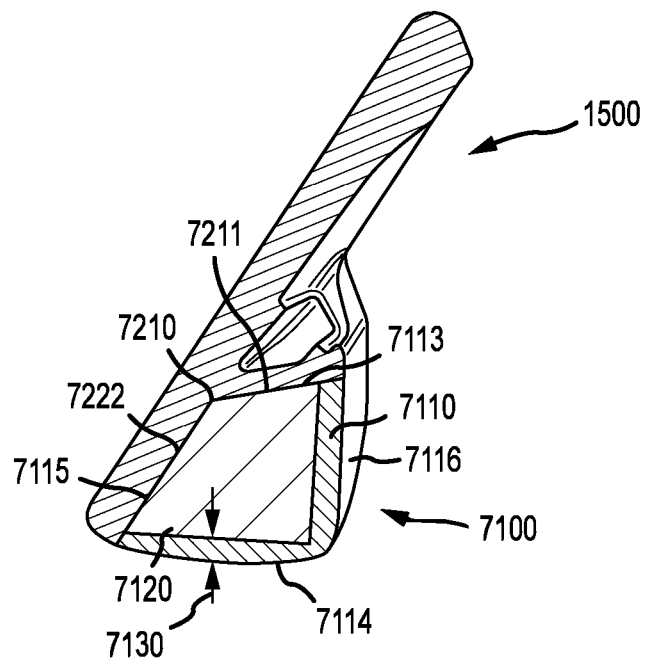
FIG. 41 illustrates the golf club head with the multi-density weight within the receptacle of FIG. 40 along a cross-sectional line 42-42.
Figure 42:
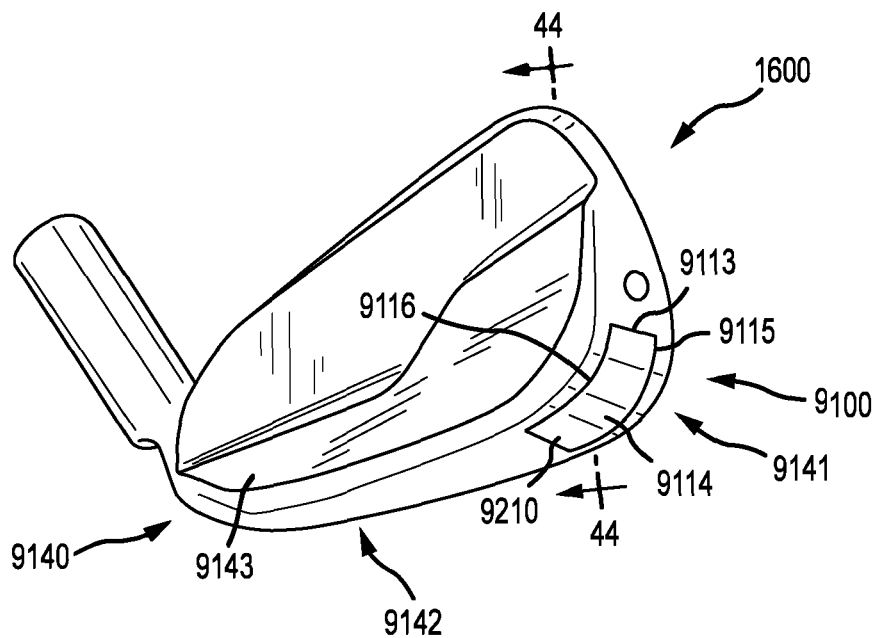
FIG. 42 illustrates a perspective view of another embodiment of a golf club head with a multi-density weight within a receptacle.

FIG. 41 illustrates a cross-sectional view taken along line 42-42 of FIG. 41 showing the multi-density weight 7100 that can be configured to couple with the receptacle 7210. The multi-density weight 7100 can be similar to the multi density weight 1100, 3100, 4100, 6100 except that it can form more of the toe region 7141 of the club head body 1500. In many embodiments, the multi-density weight 7100 can comprise a first weight component 7110 and a second weight component 7120. The multi-density weight 7100 can include a top wall 7113, a bottom wall 7114, a base 7115, and a top surface 7116. In the illustrated embodiment, the first weight component 7110 can bound the second weight component 7120 along the top surface 7116 and the bottom wall 7114.

When the multi-density weight 7100 is received within the receptacle 7210, the top wall 7113 of the multi-density weight 7100 can be configured to couple or abut against the receptacle side wall 7211 of the receptacle 7210, the base 7115 of the multi-density weight 7100 can be configured to couple or abut against the receptacle base 7222 of the receptacle 7210, the top surface 7116 can form a portion of the rear region 7143, and the bottom wall 7114 of the multi-density weight 7100 can form a portion of the sole region 7142 and a portion of the toe region 7141. The multi-density weight 7100 can be coupled (eg. by welding or brazing) to the receptacle 7210 between the edges of the first weight component 7110 and the receptacle side wall 7211 and/or receptacle base 7222.

When the multi-density weight 7100 is received within the receptacle 7210, the multi-density weight 7100 can comprise 5 to 50% of the rear region 7143 of the club head body 1500. In some embodiments, the multi-density weight 7100 can comprise 5 to 10%, 10 to 20%, 20 to 30%, 30 to 40%, or 40 to 50% of the rear region 7143 of the club head body 1500. For example, the multi-density weight 7100 can comprise 5%, 10%, 15%, 20%, 25%, 30%, 35%, 40%, 45%, or 50% of the rear region 7143 of the club head body 1500.

When the multi-density weight 7100 is received within the receptacle 7210, the multi-density weight 7100 can comprise 5 to 50% of the toe region 7141 of the club head body 1500. In some embodiments, the multi-density weight 7100 can comprise 5 to 10%, 10 to 20%, 20 to 30%, 30 to 40%, or 40 to 50% of the toe region 7141 of the club head body 1500. For example, the multi-density weight 7100 can comprise 5%, 10%, 15%, 20%, 25%, 30%, 35%, 40%, 45%, or 50% of the toe region 7141 of the club head body 1500.

When the multi-density weight 7100 is received within the receptacle 7210, the multi-density weight 7100 can comprise 5 to 50% of the sole region 7142 of the club head body 1500. In some embodiments, the multi-density weight 7100 can comprise 5 to 10%, 10 to 20%, 20 to 30%, 30 to 40%, or 40 to 50% of the sole region 7142 of the club head body 1500. For example, the multi-density weight 7100 can comprise 5%, 10%, 15%, 20%, 25%, 30%, 35%, 40%, 45%, or 50% of the sole region 7142 of the club head body 1500.

Figure 43:
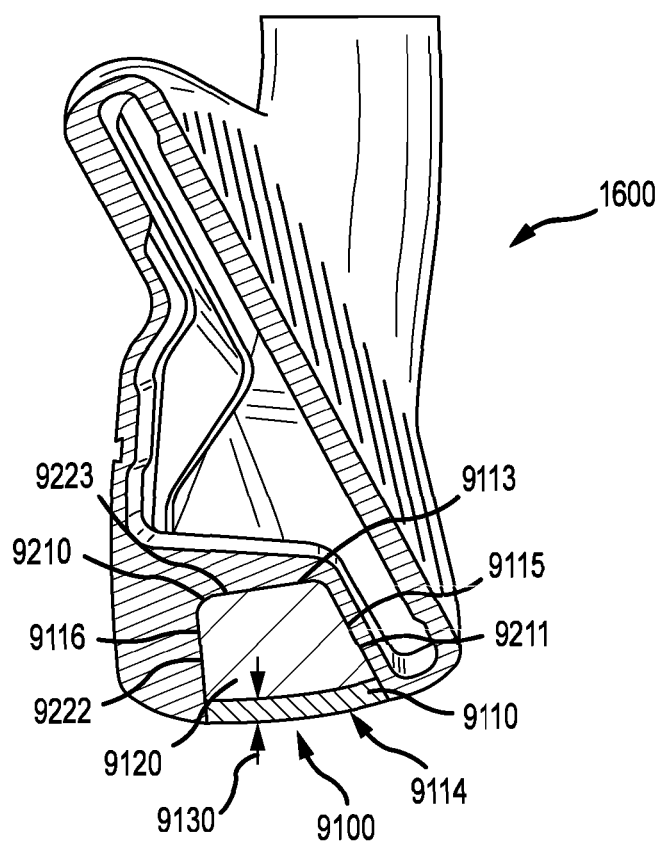
FIG. 43 illustrates the golf club head with the multi-density weight within the receptacle of FIG. 42 along a cross-sectional line 44-44.

F. Multi-Density Weight Forming a Portion of the Sole Region and the Toe Region of the Golf Club Head Body FIG. 42 and FIG. 43 illustrate a club head body 1600 having a receptacle 9210 that can be configured to receive a multi-density weight 9100. The club head body 1600 can comprise a heel region 9140, a toe region 9141, a sole region 9142, and a rear region 9143. The club head body 1600 can comprise a receptacle front wall 9211, a receptacle back wall 9222, and a receptacle top wall 9223 between the receptacle front wall 9211 and the receptacle back wall 9222. The receptacle front wall 9211, the receptacle back wall 9222, and the receptacle top wall 9223 together form the receptacle 9210. The receptacle 9210 can comprise a portion of the sole region 9142 and a portion of the toe region 9141 of the club head 1600.

In many embodiments, the receptacle 9210 can comprise 5 to 50% of the toe region 9141 of the club head body 1600. In some embodiments, the receptacle 9210 can comprise 5 to 10%, 10 to 20%, 20 to 30%, 30 to 40%, or 40 to 50% of the toe region 9141 of the club head body 1600. For example, the receptacle 9210 can comprise 5%, 10%, 15%, 20%, 25%, 30%, 35%, 40%, 45%, or 50% of the toe region 9141 of the club head body 1600.

In many embodiments, the receptacle 9210 can comprise 5 to 50% of the sole region 9142 of the club head body 1600. In some embodiments, the receptacle 9210 can comprise 5 to 10%, 10 to 20%, 20 to 30%, 30 to 40%, or 40 to 50% of the sole region 9142 of the club head body 1600. For example, the receptacle 9210 can comprise 5%, 10%, 15%, 20%, 25%, 30%, 35%, 40%, 45%, or 50% of the sole region 9142 of the club head body 1600.

In many embodiments, the receptacle 9210 can follow the transition between the sole region 9142 and the toe region 9141. The receptacle 9210 generally has a rectangular shape that follows the contour of the sole region 9142 and the toe region 9141. In other embodiments, the receptacle 9210 can have a circular, a triangular, a rectangular, a trapezoidal, a ovular, a polygonal, a kidney-bean, a peanut, or any other suitable shape.

Turning to FIG. 43, a cross-sectional view taken along line 44-44 of FIG. 42 illustrates the multi-density weight 9100 that can be configured to couple with the receptacle 9210. The multi-density weight 9100 can be similar to the multi-density weight 1100, 3100, 4100, 6100, 7100 except that it can have a rectangular shape following the transition between the sole region 9142 and the toe region 9141. In many embodiments, the multi-density weight 9100 can comprise a first weight component 9110 and a second weight component 9120. The multi-density weight 9100 can include a top surface 9113, a bottom surface 9114 opposite the top surface 9113, a front surface 9115, and a back surface 9116 opposite the front surface 9115. In the illustrated embodiment, the first weight component 9110 can bound the second weight component 9120 along the bottom surface 9114.

When the multi-density weight 9100 is received within the receptacle 9210, the top surface 9113 of the multi-density weight 9100 can be configured to couple or abut against the receptacle top wall 9223 of the receptacle 9210, the bottom surface 9114 of the multi-density weight 9100 can be configured to be form a portion of the sole region 9142 and a portion of the toe region 9141 of the club head body 1600, the front surface 9115 of the multi-density weight 9100 can be configured to couple or abut against the receptacle front wall 9211 of the receptacle 9210, the back surface 9116 of the multi-density weight 9100 can be configured to couple or abut against the receptacle back wall 9222 of the receptacle 9210. The multi-density weight 9100 can be coupled (eg. by welding, swedging, or brazing) to the receptacle 9210 between the edges of the first weight component 9110 and the receptacle front wall 9211, the receptacle back wall 9222, and the receptacle top wall 9223. In some embodiments, the receptacle 9120 can be void of the receptacle back wall 9222. In these embodiments, the first weight component 9110 and the second weight component 9120 can be exposed or form a portion of the rear region 9143 of club head body 1600.

When the multi-density weight 9100 is received within the receptacle 9210, the multi-density weight 9100 can comprise 5 to 50% of the toe region 9141 of the club head body 1600. In some embodiments, the multi-density weight 9100 can comprise 5 to 10%, 10 to 20%, 20 to 30%, 30 to 40%, or 40 to 50% of the toe region 9141 of the club head body 1600. For example, the multi-density weight 9100 can comprise 5%, 10%, 15%, 20%, 25%, 30%, 35%, 40%, 45%, or 50% of the toe region 9141 of the club head body 1600.

When the multi-density weight 9100 is received within the receptacle 9210, the multi-density weight 9100 can comprise 5 to 50% of the sole region 9142 of the club head body 1600. In some embodiments, the multi-density weight 9100 can comprise 5 to 10%, 10 to 20%, 20 to 30%, 30 to 40%, or 40 to 50% of the sole region 9142 of the club head body 1600. For example, the multi-density weight 9100 can comprise 5%, 10%, 15%, 20%, 25%, 30%, 35%, 40%, 45%, or 50% of the sole region 9142 of the club head body 1600.

G. Method of Forming a Multi-Density Weight with Multiple Weight Components

Figure 10:
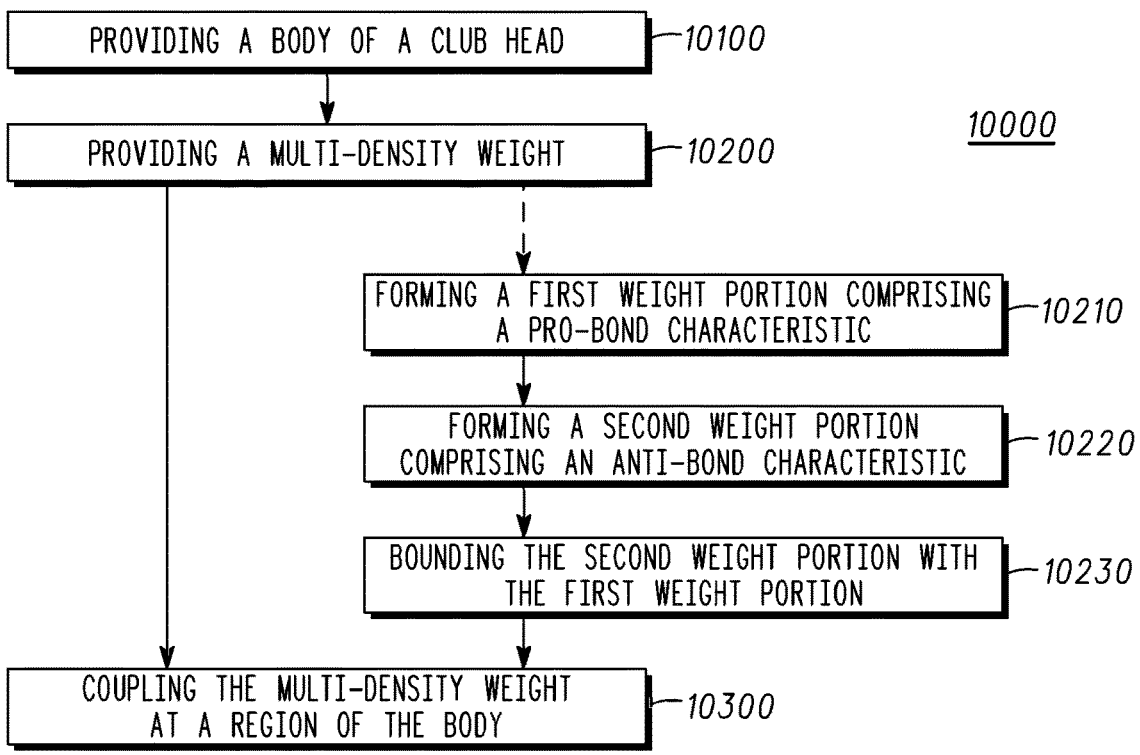
FIG. 10 illustrates a flowchart for a method of manufacturing a club in accordance with the present disclosure.

Moving along, FIG. 10 illustrates a flowchart for a method 10000 of manufacturing a club in accordance with the present disclosure. In some embodiments, the club of method 10000 can be similar to club 1 (FIGS. 1-2), or to club 5 (FIG. 5).

Block 10100 of method 10000 comprises providing a body of a club head for the club of method 10000. In some embodiments, the body of the club head can be similar to body 1200 of club head 11 (FIG. 1, 2, 5). In other embodiments, the body of the club head of method 10000 can relate to other types of clubs different than those corresponding to FIGS. 1-9. The body of the club head can comprise a body material such as steel in some examples, and can comprise a recess similar to receptacle 2210 (FIG. 2, 5).

Block 10200 of method 10000 comprises providing a multi-density weight. The multi-density weight can be similar to one of multi-density weights 1100 (FIGS. 1-4), 5100 (FIGS. 5-7), and/or 8100 (FIGS. 8-9). Block 10200 can comprise several sub-blocks in some embodiments, as described below.

Sub-block 10210 of block 10200 comprises forming a first weight portion of the multi-density weight. In some embodiments, the first weight portion can be similar to weight components 1110 (FIGS. 1-4), 5110 (FIG. 5-7), or 8110 (FIGS. 8-9). In the same or a different embodiment, the first weight portion can comprise a first material different than a body material of the body of block 10100, where the first material has a first density. As an example, the first material can comprise a tungsten-nickel alloy material. The first material of the first weight portion of sub-block 10210 also exhibits a pro-bond characteristic relative to the body material of the body. In some embodiments, the pro-bond characteristic can enable proper welding of the first weight portion to the body of block 10100.

Sub-block 10220 of block 10200 comprises forming a second weight portion of the multi-density weight. In some embodiments, the second weight portion can be similar to weight components 1120 (FIGS. 1-4), 5120 (FIG. 5-7), or 8120 (FIGS. 8-9). In the same or a different embodiment, the second weight portion can comprise a second material different than the body material of the body or the first material of the first weight portion. The second material has a second density greater than the first density of the first weight portion in at least some embodiments. For example, the second material can comprise a tungsten material. The second material of the second weight portion of sub-block 10220 also exhibits an anti-bond characteristic relative to the body material of the body. In some embodiments, the anti-bond characteristic can be similar to the weld-averse trait described above with respect to weight component 1120.

In some embodiments, sub-block 10210 can comprise forming the first weight portion to comprise an inner space and a periphery conforming to a perimeter of the multi-density weight, while sub-block 10220 can comprise forming a perimeter of the second weight portion to nest in the inner space of the first weight portion. As an example, the periphery of the first weight portion can be similar to periphery 1112 as conformed to perimeter 1111 (FIGS. 1-7) for weights 1100 (FIGS. 1-4) and 5100 (FIGS. 5-7). As also seen in the example of FIGS. 1-4, the perimeter of the second weight portion can be similar to perimeter 1121 of weight component 1120, bounding weight component 1120 to nest in inner portion 2113 of weight component 1110. A similar analogy can be made with respect to perimeter 5121 bounding weight component 5120 to nest in inner portion 5113 of weight component 5110.

In examples similar to that of FIGS. 1-4, the inner space of the first weight portion can be bounded by a tub surface, and the second weight portion can conform to the tub surface of the first weight portion. In such examples, the inner space can be similar to inner portion 2113 (FIG. 2), as bounded by the tub surface formed by the combination of base 2114 and wall 2115, and the second weight portion conforms to the tub surface as shown for weight component 1120 coupled to inner portion 2113 (FIGS. 2, 4).

Sub-block 10230 of block 10200 comprises bounding the second weight portion of block 10220 with the first weight portion of block 10210 to form the multi-density weight. In some examples, the first weight portion can bound the second weight portion as illustrated in FIGS. 3-4 with respect to weight components 1110 and 1120. In other examples, the second first weight portion can bound the second weight portion as illustrated in FIGS. 6-7 with respect to weight components 5110 and 5120.

Sub-block 10230 can be performed in one of several different ways. In one example, the second weight portion can be bounded with the first weight portion by bonding the second weight portion to the inner space of the first weight portion with an epoxy material. In the example of FIGS. 1-4, the epoxy material can be located between base 2114 and a bottom of weight component 1120, and between wall 2115 of weight component 1110 and perimeter 1121 of weight component 1120.

Another way of performing sub-block 10230 can comprise swedging the second weight portion into the inner space of the first weight portion. In such embodiments, an inner wall defining the inner space of the first weight portion can comprise a perimeter or other dimensions configured to compress against the second weight portion. For instance, in the embodiment of FIG. 4, a perimeter of wall 2115 of weight portion 1110 can be substantially equal to, or slightly less than, perimeter 1121 of weight portion 1120. As a result, weight portion 1120 is held in place by compressive forces when force-pressed into the inner space within wall 2115 and thereby bounded by the weight portion 1110.

Figure 14:
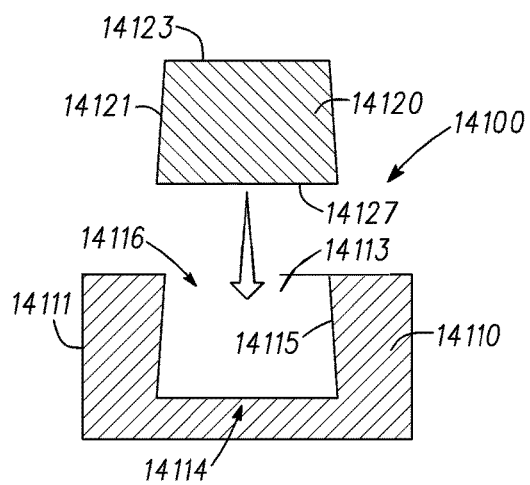
FIG. 14 illustrates an exploded cross sectional view of a multi-density weight similar to the multi-density weight of FIGS. 1-4.

In another example of swedging, such as shown in FIG. 14, multi-density weight 14100 can be similar to multi-density weight 1100 (FIGS. 1-4) and can comprise weight element 14110 to couple with weight element 14120. Weight elements 14110 and 14120 can be similar to weight elements 1110 and 1120, respectively, but bottom 14127 of weight element 14120 is slightly larger than opening 14116 of inner portion 14113 of weight element 14110. As a result, when weight element 14120 is swedged into inner portion 14113 of weight element 14110, at least one of bottom 14127 or wall 14115 may at least temporarily elastically deform to permit bottom 14127 to enter inner portion 14113 through opening 14116. Once swedged into inner portion 14113, wall 14115 may compress around perimeter 14121 of weight element 14120 to maintain weight element 14120 in place.

Figure 15:
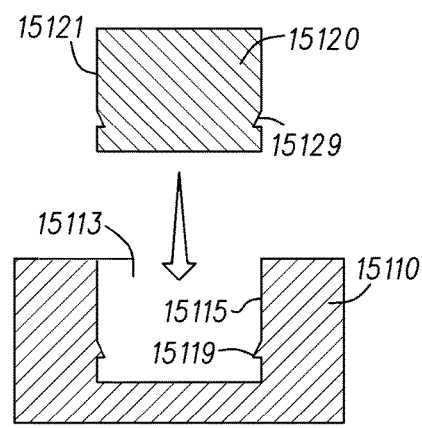
FIG. 15 illustrates an exploded cross sectional view of a multi-density weight similar to the multi-density weight of FIGS. 1-4 but comprising barbing elements.

FIG. 15 shows another example of swedging, similar to the example of FIGS. 4 and 14, but comprising weight elements 15110 and 15120. Weight elements 15110 and 15120 can be similar to weight elements 1110 and 1120, respectively, but each comprise respective barbing elements 15119 and 15129 configured to interlock with each other when weight element 15120 is swedged into inner portion 15113 of weight element 15110 to maintain weight element 15120 in place when wall 15115 of weight element 15110 compresses around perimeter 15121 of weight element 15120. In some examples, barbing elements 15119 and/or 15129 may interlock via compression or crushing when weight portion 15120 is force-pressed into inner space 15113 of weight portion 15110. Although in the present example barbing elements 15119 and 15129 are shown as respectively circumscribing perimeter 15121 and wall 15115, there can be other embodiments without full circumscription. There can also be embodiments comprising more than one set of barbing elements, and/or where the barbing elements are located elsewhere, such as near the top or bottom of perimeter 15121 and wall 15115.

Continuing with other examples for sub-block 10230 in FIG. 10, another way of bounding the second weight portion with the first weight portion can comprise sintering, such as shown in FIGS. 11-12. FIG. 11 illustrates a flowchart of a method 11000 for sintering the second weight portion of block 10220 at the inner space of the first weight portion of block 10210. FIG. 12 illustrates a cross section of mold 12500 used to form weight portion 12110, where weight portion 12110 can correspond to the first weight portion of block 10210 (FIG. 10). FIG. 13 illustrates a cross section of mold 12500 used to form weight portion 13120, where weight portion 13120 can correspond to the second weight portion of block 10220.

Block 11100 of method 11000 comprises providing a first mold comprising a first mold base circumscribed by a first mold wall. In some examples, the mold can be similar to mold 12500 of FIGS. 12-13.

Block 11200 of method 11000 comprises coating the first mold base with the first material to form a first material base. In the example of FIG. 12, the first material can correspond to base 12114 over mold base 12520. In the same or a different example, the first material in block 11200 can be similar to a material of weight component 1110 as described above. In the same or a different embodiment, the first material can be in powdered form when first placed over the mold base.

Block 11300 of method 11000 comprises coating the first mold wall with the first material to form a first material wall circumscribing the first material base. In the example of FIG. 12, the first material wall can correspond to wall 12115 bounded by mold wall 12510 and circumscribing base 12114. In the same or a different embodiment, the first material can also be in powdered form when first placed within the bounds of mold wall 12510.

Block 11400 of method 11000 comprises forming the inner space of the first weight portion to be bounded by the first material base and the first material wall. In some examples, the inner space can correspond to inner space 12113, similar to inner portion 2113 of weight component 1110 (FIG. 1). In the same or different examples, the inner space can be formed by shaping the powdered form of the first material to the desired contour for the inner portion.

Method 11000 also comprises block 11800, comprising placing a second material of the second weight portion into the inner space of the first weight portion. In the example of FIG. 13, the second material can correspond to the material of weight portion 13120, which can be similar to weight component 1120 (FIGS. 1-4). In the same or a different embodiment, the second material can be in powdered form when first placed into the inner space of the first weight. In some examples, the first material of the first weight portion can be at least partially sintered before block 11800 is carried out.

Block 11900 of method 11000 comprises sintering the first and second materials of the first and second weight portions together. Such sintering can be performed at a suitable temperature and/or pressure to effectively bond the first and second materials together.

In some examples, method 11000 can comprise blocks 11500-11700 between blocks 11400 and 11800. In such examples, block 11500 can comprise providing a second mold, while block 11600 can comprise placing the second material of the second weight portion into the second mold. The second material can be in powdered form when placed into the second mold in some examples. Block 11700 then comprises at least partially sintering the second material in the second mold to shape the second weight portion to correspond to the contour of the inner space of the first weight portion as formed in block 11400. Method 11000 can then continue in block 11800 as described above when the second weight portion is removed from the second mold and placed into the inner space of the first weight portion.

Returning to FIG. 10, in other embodiments, blocks 10210, 10220 and 10230 can be combined. For example, the weight component 1110 and weight component 1120 can be formed simultaneously using additive manufacturing. Any suitable additive manufacturing process can be used, such as 3D printing, additive layer manufacturing, direct digital manufacturing, or rapid prototyping.

Referring again to FIG. 10, block 10300 of method 10000 comprises coupling the multi-density weight of block 10200 to a region of the body of block 10100. In at least some embodiments, a perimeter of the multi-density weight can be secured to a wall of the recess of the body described in block 10100, where the wall can be similar to wall 2211 of receptacle 2210 (FIGS. 2, 5).

In some examples, block 10300 can be carried out by welding the multi-density weight to the region of the body. For example, in the embodiment of FIGS. 1-4, a weld may be formed to join weight component 1110 to at least receptacle wall 2211 of body 2211. Block 10300 can also be carried out in some embodiments by brazing the multi-density weight to the region of the body. For example, in the embodiment of FIGS. 1-4, a brazed joint can be produced when capillary action between receptacle wall 2211 of body 1200 and perimeter 1111 of weight component 1110 absorbs melted brazing material to secure multi-density weight 1100 to receptacle 2211 of body 1200.

Figure 16:
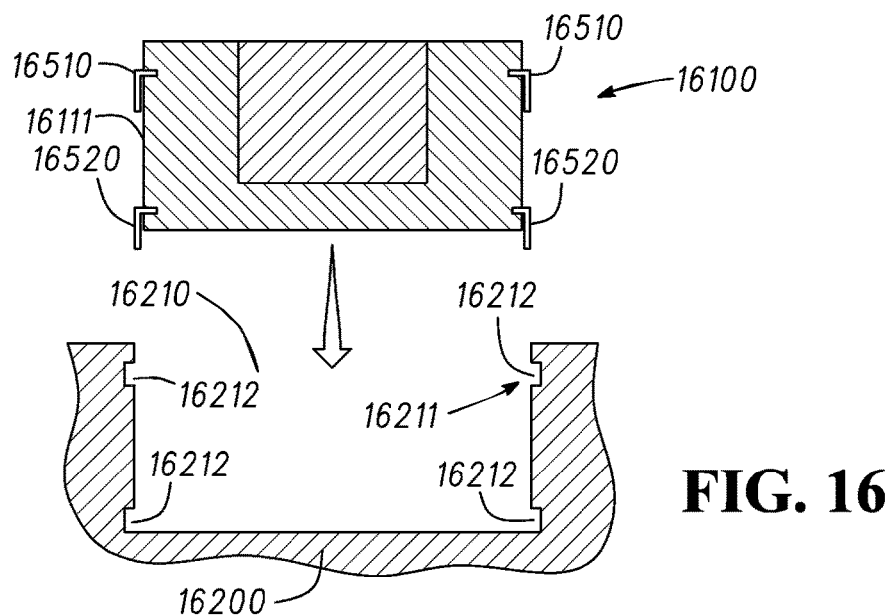
FIG. 16 illustrates an exploded cross sectional view of a multi-density weight being coupled with a recess of a body of a club head via compression elements.
Figure 17:
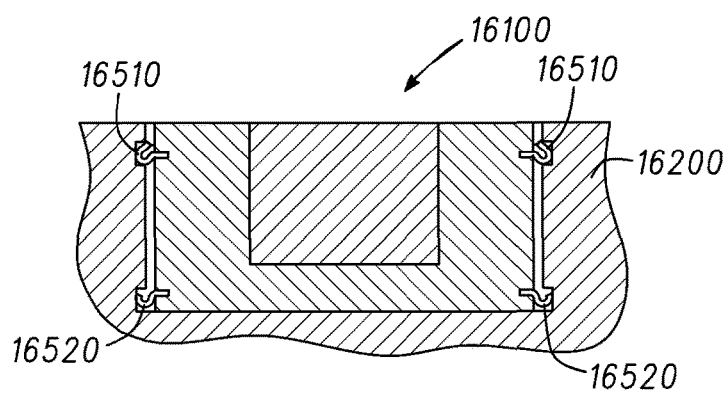
FIG. 17 illustrates a cross sectional view of the multi-density weight and recess of FIG. 16 coupled together.

There can be examples where block 10300 of method 10000 is carried out by compressing a compression element between the multi-density weight and the region of the body. In such examples, block 10200 can further comprise providing the compression element coupled at least partially around the perimeter of the multi-density weight, while block 10300 can comprise expansively deforming the compression element between the multi-density weight and a wall of a recess at the region of the body. In the same or other examples, the compression element can comprise a compression ring. For instance, FIG. 16 shows an embodiment of multi-density weight 16100 being coupled with recess 16210 of body 16200 of a club head, where multi-density weight 16100 is similar to multi-density weight 1100 (FIGS. 1-4), but comprises compression elements 16510 and 16520. FIG. 17 shows multi-density weight 16100 as coupled with recess 16210 (FIG. 16). In the example of FIGS. 16-17, compression elements 16510 and 16520 comprise compression rings that at least partially circumscribe perimeter 16111 of multi-density weight 16100. When pressed into recess 16210, as shown in FIG. 17, compression elements 16510 deform or bulge against wall 16211 and thereby secure multi-density weight 16100 at recess 16210. FIGS. 16-17 show compression elements 16510 and 16520 coupling with respective grooves 16212 of wall 16211, but there can be other embodiments where one or more compression elements 16510 and/or 16520 compress against a wall similar to wall 16211 but comprising no grooves. There can be embodiments with only one compression element, rather than the two compression rings 16510 and 16520 of multi-density weight 16100. As an example, some embodiments may use only compression ring 16520.

In other embodiments, the compression element can comprise one or more protrusions instead of a compression ring, where the one or more protrusions can be configured to buckle against the wall of the recess when the multi-density weight is pressed against the recess. For example, in some embodiments, the protrusion could protrude past a top surface of the multi-density weight, and would bulge against the top rim of the recess when buckled. In another embodiment, the protrusion could protrude past a bottom surface of the multi-density weight, and would bulge against the bottom of the wall of the recess when buckled.

Figure 18:
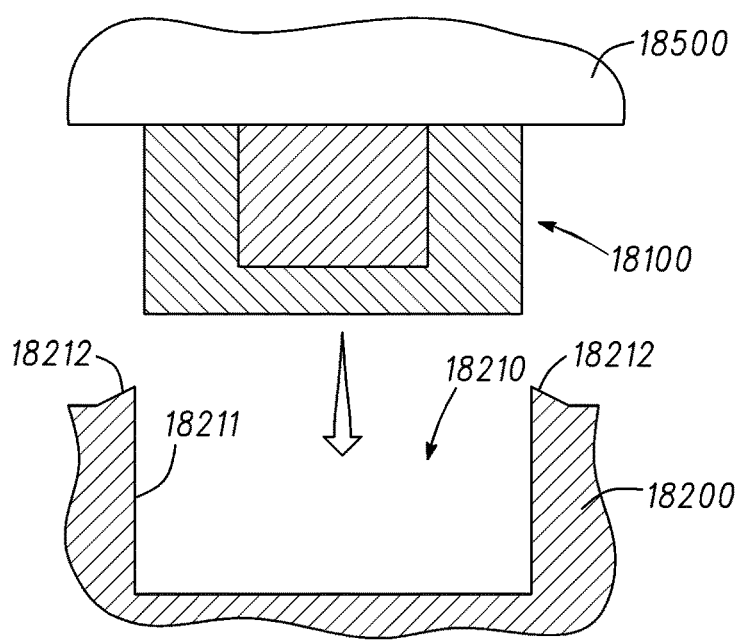
FIG. 18 shows a multi-density weight being pressed into a recess a body of a club head comprising a deformable lip.
Figure 19:
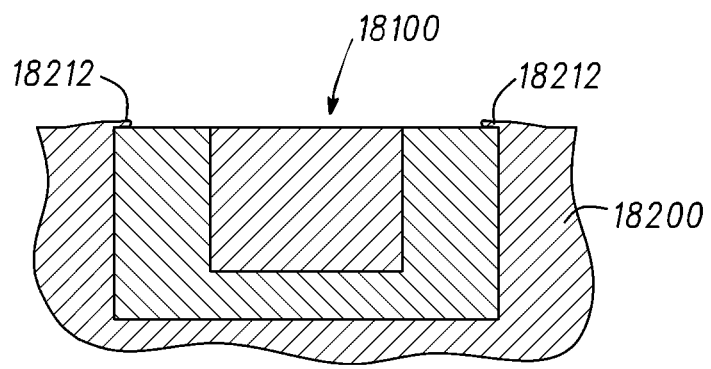
FIG. 19 shows the multi-density weight and recess of FIG. 18 coupled together.

Block 10300 also can be carried out in accordance with FIGS. 18-19 in some embodiments. FIG. 18 shows multi-density weight 18100 being pressed by press 18500 into recess 18210 of body 18200 of a club head, while FIG. 19 shows multi-density weight 18100 as coupled with recess 18210. Multi-density weight 18100 is similar to multi-density weight 1100 (FIGS. 1-4), and recess 18210 is similar to recess 2210 (FIG. 2), but recess 18210 differs by comprising lip 18212 at a rim of wall 18211 of recess 18210. As seen in FIGS. 18-19, as press 18500 presses multi-density weight 18100 into recess 18210, press 18500 folds, bends, or otherwise deforms lip 18212 over at least a portion of a top of multi-density weight 18100, thereby securing multi-density weight 18100 within recess 18210. Although in the present example, the rim of wall 18211 is completely circumscribed by lip 18212, there can be other examples where lip 18212 may circumscribe only a portion the rim of wall 18211, and/or there may be other lips similar to lip 18212 at other portions of the rim of wall 18211. In some examples, a 60-120 ton press may be used to press multi-density weight 18100 into recess 18210.

There can also be examples where one or more of blocks 10300 and/or 10230 of method 10000 can be carried out by plating a portion of at least one of the first or second weight portions. Some embodiments may comprise plating at least part of an exterior of the second weight component of block 10220, such that the plating material will be located between the second weight component and the first weight component when block 10230 is carried out to bound the second weight portion with the first weight portion. In the same or a different embodiment, at least part of an exterior of the first weight component of block 10210 can be plated such that the plating material will be located between the second weight component and the first weight component when block 10230 is carried out, and/or such that the plating material will be located between the multi-density weight and the region of the body when block 10300 is carried out. In the same or different embodiments, the plating material can deform when blocks 10230 and/or 10300 of method 10000 are carried out, including situations where at least part of the multi-density weight is swedged.

In some examples, one or more of the different blocks of method 10000 and/or 11000 can be combined into a single block or performed simultaneously, and/or the sequence of such blocks can be changed. For example, blocks 10220 and 10230 can be combined into a single block in some embodiments, such as when blocks 11800-11900 of method 11000 are carried out. In the same or other examples, some of the blocks of method 10000 and/or method 11000 can be subdivided into several sub-blocks. For example, providing the body of the club head in block 10100 may comprise further sub-blocks such as forming a strike face of the golf club head. There can also be examples where method 10000 and/or 11000 can comprise further or different blocks. As an example, method 10000 can also comprise providing a golf club shaft to attach to the club head of block 10100. Method 10000 and/or 11000 can also comprise optional blocks in some implementations. For example, blocks 11500, 11600, and 11700 can be optional in some examples. Other variations can be implemented for method 10000 and/or method 11000 without departing from the scope of the present disclosure.

Although, in the figures above, head body is illustrated as an iron-type golf club head body, the disclosure herein is not limited in that respect. For example, the head body could comprise a driver-type head body, a fairway wood-type head body, a hybrid-type head body, an iron-type or wedge-type head body, or a putter-type head body in some implementations.

II) Multi-Density Weight Comprising a Shell Portion and a Weight Member

In one embodiment, a golf club head can comprise a head body comprising an interior cavity and a body opening coupled to the interior cavity, a shell portion configured to couple to the body opening, a bracket coupled to the shell portion, and a weight member coupled to the bracket. The weight member can be denser and harder than the head body, denser and harder than the bracket, and/or denser and harder than the shell portion. The bracket and the weight member can be configured to be fully contained within the interior cavity. The bracket can comprise a malleable lip configured to clamp the weight member in place at the shell portion. The bracket and the shell portion can comprise a single piece of the same material. A weld bead can couple the shell portion to the body opening throughout a total thickness of a perimeter of the shell portion. The shell portion can comprise at least a portion of a sole of the golf club head, and can be located closer to a front portion of the golf club head than a rear portion of the golf club head. The weight member can comprise a weight thickness of (a) less than approximately 6.4 mm if the golf club head comprises a fairway-wood-type head, (b) less than approximately 5.5 mm if the golf club head comprises a driver-type head, or (c) less than approximately 8.5 mm if the golf club head comprises a hybrid-type head. The weight member can also comprise a weight volume of (a) less than approximately 15 cc if the golf club head comprises the fairway-wood-type head, (b) less than approximately 12 cc if the golf club head comprises the a driver-type head, or (c) less than approximately 20 cc if the golf club head comprises the hybrid-type head. A specific gravity of the weight member can be of approximately 18 to approximately 20. A material of the weight member can be at least one of a tungsten material, a nickel material, a cadmium material, a copper material, or a metal-infused plastic material. The shell portion can comprise at least one of a steel material or a titanium material. The weight member can adjust a center of gravity of the golf club head (a) at least 0.38 mm towards the sole if the golf club head comprises the fairway-wood-type head, (b) at least 0.25 mm towards the sole if the golf club head comprises the driver-type head, or (c) at least 0.4 mm towards the sole if the golf club head comprises the hybrid-type head.

In one embodiment, a golf club head can comprise a head body comprising an interior cavity and a body opening coupled to the interior cavity, a shell portion configured to couple to the body opening, a bracket coupled to the shell portion, and a weight member coupled to the bracket. The weight member can be denser and harder than the bracket, and/or denser and harder than the shell portion. The bracket and the weight member can be configured to be fully contained within the interior cavity. The bracket can comprise a malleable lip configured to plastically deform to clamp the weight member in place at the shell portion.

In one implementation, a method for making a golf club head can comprise providing a head body of the golf club head, providing a weight member, providing a shell portion configured to couple with a body opening of the head body, coupling the weight member to the shell portion, and coupling the shell portion to the body opening. Providing the shell portion can comprises providing an interior side of the shell portion configured to face an interior cavity of the head body, and providing a bracket coupled to the interior side of the shell portion, the bracket comprising a malleable lip. Providing the weight member can comprise providing the weight member with a density greater than a density of the bracket and greater than a density of the shell portion, and providing the weight member with a hardness greater than a hardness of the bracket and greater than a hardness of the shell portion. Coupling the weight member to the shell portion can comprise inserting the weight member into the bracket, and clamping the weight member to the bracket by plastically deforming the malleable lip over at least an inner portion of the weight member, the inner portion of the weight member configured to face towards the interior cavity of the head body. Coupling the shell portion to the body opening can comprise fully containing the weight member and the bracket within the interior cavity of the head body.

In one embodiment, a golf club head can comprise a head body bounding an interior cavity and comprising a body opening, a shell portion configured to couple to the body opening, and a weight member encapsulated within the shell portion. The shell portion can comprise first and second shell sides opposite each other, and a capsule defined between the first and second shell sides and containing the weight member. A density of the weight member can be greater than a density of the shell portion and a density of the head body. The first shell side, the capsule, and the weight member, can be internal to the interior cavity. When encapsulated, the weight member can be configured to remain substantially within the capsule of the shell portion. The shell portion can comprise at least a portion of a sole of the golf club head, and can be located closer to a front portion of the head body than a rear portion of the head body. The weight member can comprise a weight mass, a weight thickness, and a weight volume. The weight thickness can be (a) less than approximately 6.4 mm if the golf club head can comprise a fairway-wood-type head, (b) less than approximately 5.5 mm if the golf club head can comprise a driver-type head, or (c) less than approximately 8.5 mm if the golf club head can comprise a hybrid-type head. The weight volume can be (a) less than approximately 15 cc if the golf club head can comprise the fairway-wood-type head, (b) less than approximately 12 cc if the golf club head can comprise the a driver-type head, or (c) less than approximately 20 cc if the golf club head can comprise the hybrid-type head. A specific gravity of the weight member can be of approximately 18 to 20. A material of the weight member can be at least one of a tungsten material, a nickel material, a cadmium material, a copper material, or a metal-infused plastic material. The shell portion can comprise at least one of a steel material, or a titanium material. The weight member can adjust a center of gravity of the golf club head (a) at least 0.38 mm towards the sole if the golf club head can comprise the fairway-wood-type head, (b) at least 0.25 mm towards the sole if the golf club head can comprise the driver-type head, or (c) at least 0.4 mm towards the sole if the golf club head can comprise the hybrid-type head. The weight mass can be (a) at least approximately 9.5% of a mass of the golf club head if the golf club head can comprise the fairway-wood-type head, (b) at least approximately 3% of the mass of the golf club head if the golf club head can comprise the driver-type head, or (c) at least approximately 12% of the mass of the golf club head if the golf club head can comprise the hybrid-type head. The weight volume can be (a) at most approximately 14% of a volume of the golf club head if the golf club head can comprise the fairway-wood-type head, (b) at most approximately 5% of the volume of the golf club head if the golf club head can comprise the driver-type head, or (c) at most approximately 30% of the volume of the golf club head if the golf club head can comprise the hybrid-type head.

In one embodiment, a golf club head can comprise a head body bounding an interior cavity and comprising a body opening, a shell portion configured to couple to the body opening, and a weight member encapsulated within the shell portion. The shell portion can comprise a first shell side, a second shell side opposite the first shell side, and a capsule defined between the first and second shell sides and containing the weight member. A density of the weight member can be greater than a density of the shell portion.

In one implementation, a method for making a golf club head can comprise providing a head body of the golf club head, providing a weight member, providing a shell portion configured to couple with a body opening of the head body, coupling the weight member to the shell portion, and coupling the shell portion to the body opening. Providing the shell portion can comprise providing a first shell side configured to face an interior cavity of the head body, providing a second shell side opposite the first shell side, and providing a capsule between the first and second shell sides to contain the weight member. A density of the weight member can be greater than a density of the shell portion.

Other examples and embodiments are further disclosed herein. Such examples and embodiments may be found in the figures, in the claims, and/or in the present description.

A. Multi-Density Weight Comprising a Bracket and a Weight Member

Figure 22:
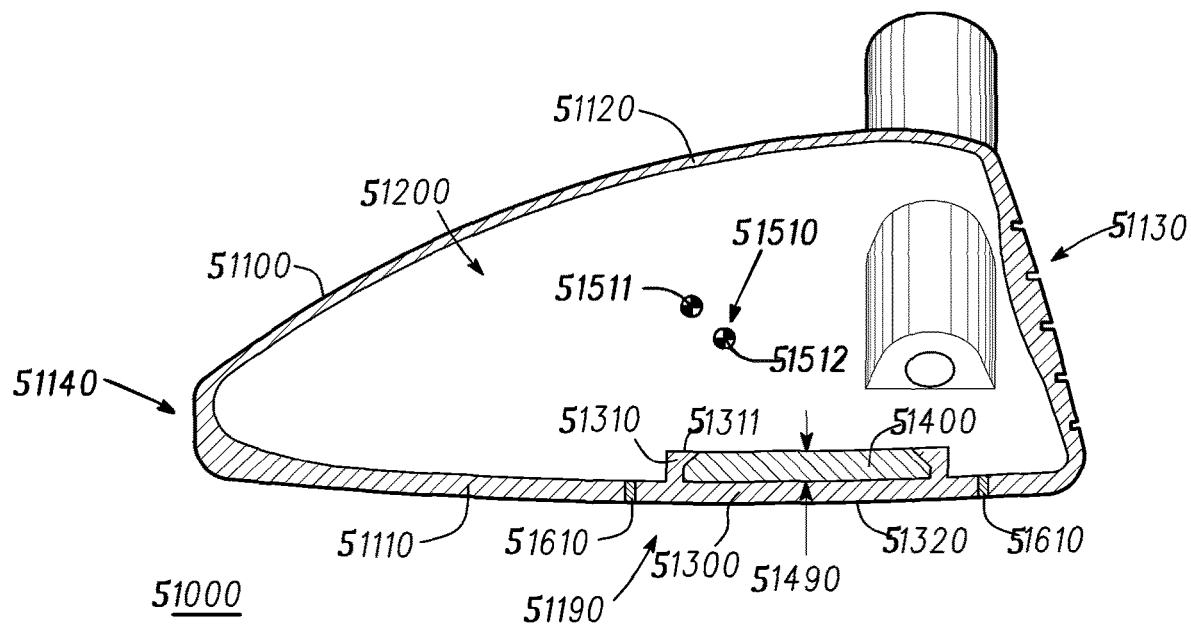
FIG. 22 illustrates a side cross-sectional view of a golf club head, along line I-I of FIG. 23, with a weighted shell portion coupled thereto.
Figure 23:
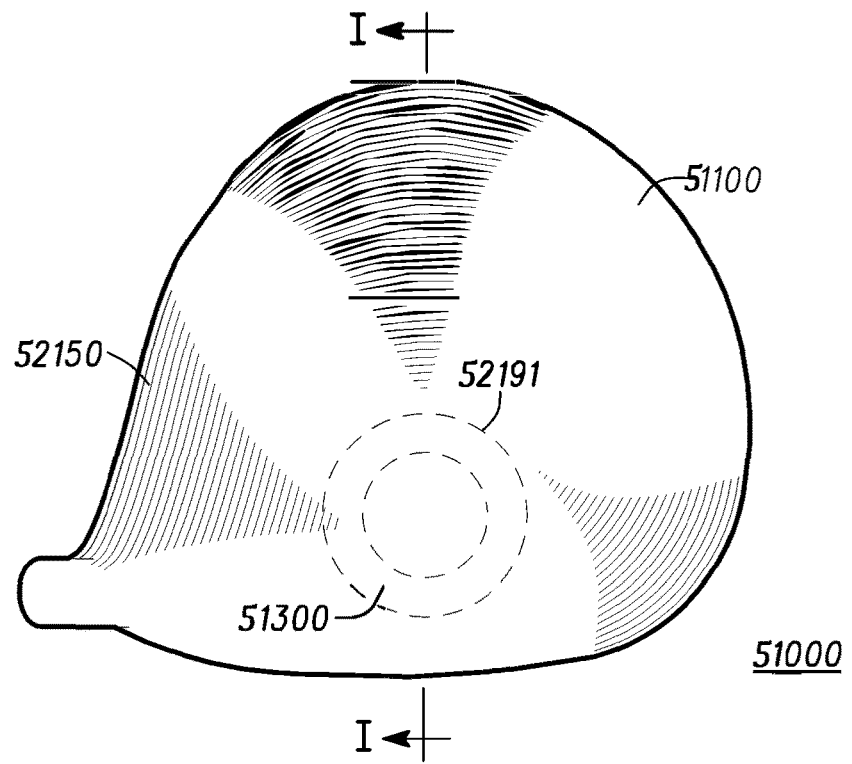
FIG. 23 illustrates a bottom view of the golf club head of FIG. 22.
Figure 24:
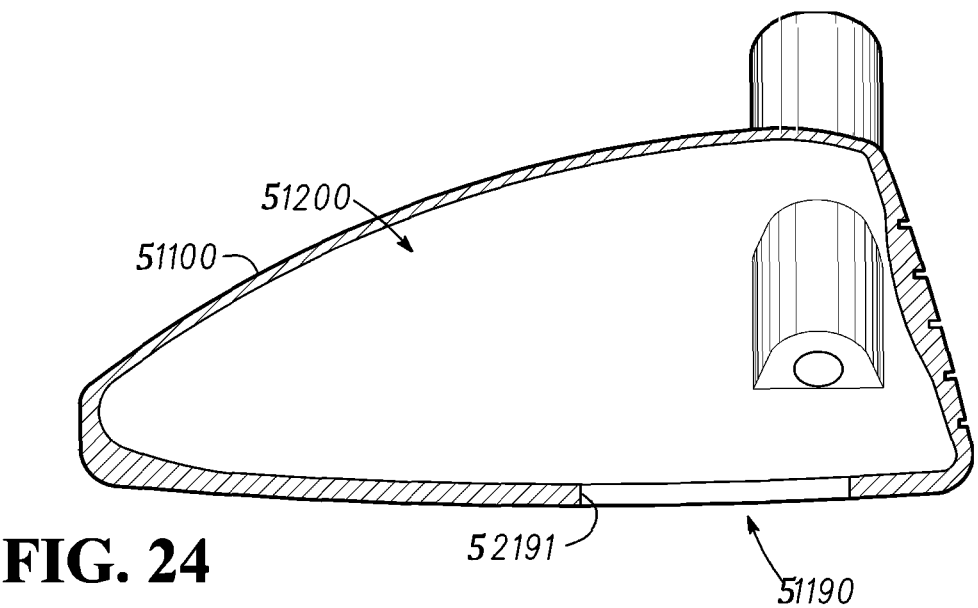
FIG. 24 illustrates a side cross-sectional view the golf club head of FIG. 22 without the weighted shell portion coupled to a body opening thereof.

Turning to the drawings, FIG. 22 illustrates a side cross-sectional view of golf club head 51000 along line I-I of FIG. 23, with shell portion 51300 coupled thereto. FIG. 23 illustrates a bottom view of golf club head 51000. FIG. 24 illustrates a side cross-sectional view of golf club head 51000 without shell portion 51300 (FIGS. 22-23) at body opening 51190.

In the present example, golf club head 51000 comprises head body 51100 bounding a portion of interior cavity 51200, and also comprises shell portion 51300 coupled to head body 51100 at body opening 51190. Body opening 51190 provides an aperture at sole portion 51110 of head body 51100 to interior cavity 51200, but there can be other embodiments where body opening 51190 could be located at other portions of head body 51100, such as at crown portion 51120, front portion 51130, rear portion 51140, and/or skirt portion 52150 (FIG. 23), to receive thereat respective shell portions similar to shell portion 51300.

Golf club head 51000 also comprises weight member 51400 coupled to shell portion 51300 via bracket 51310, where bracket 51310 comprises cavity 54370 (FIG. 25) complementary to the shape of weight member 51400. In the present example, a density of weight member 51400 is greater than a density of bracket 51310 and greater than a density of shell portion 51300, such that weight member 51400 will permit adjustment of a center of gravity of golf club head 51000 when coupled to head body 51100. Weight member 51400 and bracket 51310 are fully contained within interior cavity 51200, such as to maintain the exterior view aspect of golf club head 51000 if desired. There may be other embodiments, however, where bracket 51310 could instead face forwards or be exposed at an exterior of golf club head 51000 and/or couple weight member 51400 externally to golf club head 51000. Bracket 51310 can be integral with or non-integral with shell portion 51300.

Weight member 51400 can comprise a material with a weld-averse characteristic that can be substantially non-weldable to a material of head body 51100. For instance, the weld-averse characteristic can entail a propensity for becoming brittle or for cracking after welding or brazing. In one example, weight member 51400 can comprise a tungsten material, a nickel material, a cadmium material, a copper material, a gold material, and/or another high density material, where such material(s) may be substantially pure, dense alloys thereof, or composites thereof, and/or where such materials can comprise a specific gravity greater than approximately 14, such as a specific gravity of approximately 18-20. In one example, one such composite material can comprise a metal-infused plastic and/or resin, such as an infused thermoplastic urethane material having tungsten, nickel, cadmium, copper, gold, and/or other dense metal particles. In the same or other embodiments, a material of shell portion 51300 and/or a material of head body 51100, such as at perimeter 52191 (FIG. 23) of body opening 51190, may comprise a lower density material, such as a steel material or a titanium material, that would be substantially incompatible for reliably welding or brazing with the material of weight member 51400.

In light of the above, bracket 51310 is configured to secure weight member 51400 in place at shell portion 51300 in a non-welded and non-brazed manner, where shell portion 51300 can be welded or brazed to head body 51100 at perimeter 52191 (FIGS. 2-3) of body opening 51190. In the present example, bracket 51310 comprises malleable lip 51311 to secure weight member 51400 in place, as further described below, and is thus configured to secure weight member 51400 to shell portion 51300 without the need to rely on screw(s), adhesive(s), rivet(s), welding, or brazing. In this present example, weight member 51400 is coupled or secured to shell portion 51300 only by using malleable lip 51311 to physically keep weight member 51400 against shell portion 51300.

Figure 25:
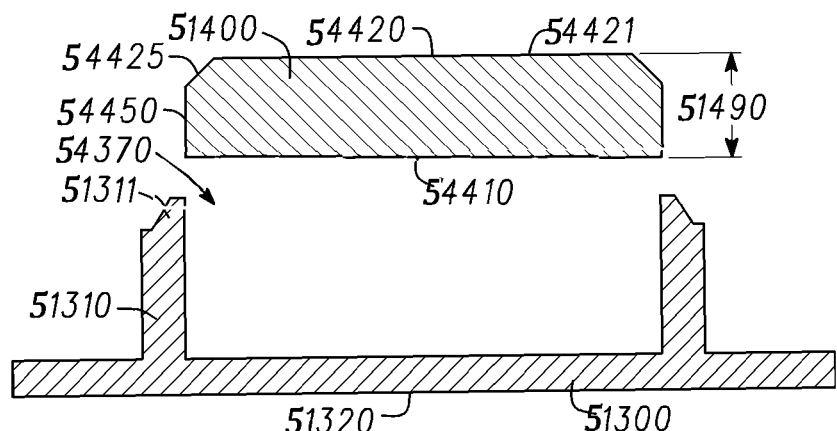
FIG. 25 illustrates a side cross-sectional view of a weight member prior to coupling to a bracket of the weighted shell portion of FIG. 22.
Figure 26:
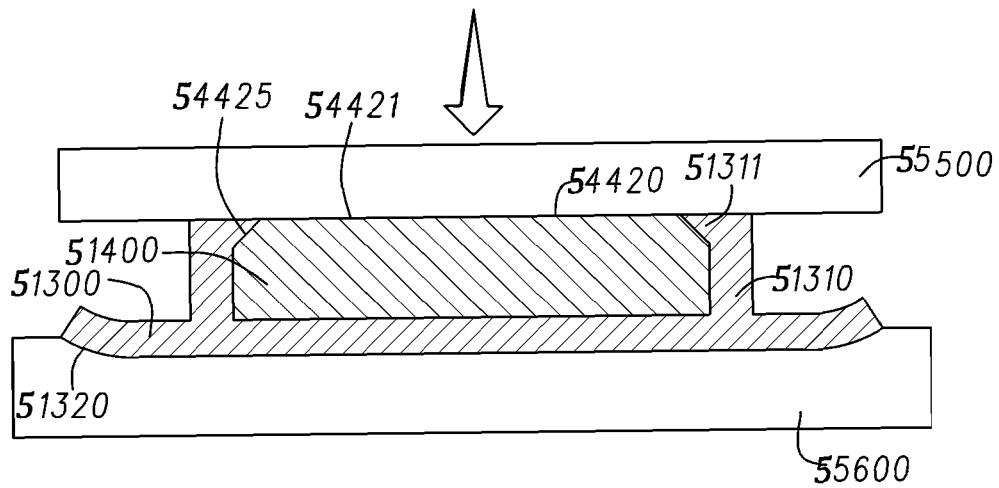
FIG. 26 illustrates a side cross-sectional view of the weight member secured to the bracket after swedging by a press.

FIG. 25 illustrates a side cross-sectional view of weight member 51400 prior to coupling to bracket 51310 of shell portion 51300. FIG. 26 illustrates a side cross-sectional view of weight member 51400 secured to bracket 51310 after swedging by press 55500. In the present example, weight member 51400 comprises shell end 54410 configured to face shell portion 51300, and interior end 54420 opposite shell end 54410 and configured to face interior cavity 51200 (FIG. 22) of golf club head 51000 (FIG. 22) when shell portion 51300 is coupled to body opening 51190 (FIG. 22). As seen in FIG. 25, malleable lip 51311 is initially upright to permit weight member 51400 to be inserted into bracket 51300, but as seen in FIG. 26, is configured to fold over at least a portion of a perimeter of interior end 54420 of weight member 51400 to thereby secure weight member 51400 to shell portion 51300.

Returning to FIG. 25, interior end 54420 of weight member 51400 also comprises interior end surface 54421 and chamfer transition 54425 between interior end surface 54421 and weight sidewall 54450 of weight member 51400. As seen in FIG. 26, malleable lip 51311 of bracket 51310 is configured to substantially conform to a shape complementary to chamfer transition 54425 when pressed by press 55500 against weight member 51400. Chamfer transition 54425 thus allows malleable lip 51311 to engage and secure weight member 51400 without placing undue stress on bracket 51300 and/or weight member 51400, and permits malleable lip 51311 to conform to a predetermined thickness and shape to remain structurally sound when pushed and deformed by press 55500 to permit proper securing of weight member 51400. In the present example, malleable lip 51311 of bracket 51310 is configured to fold over across an entirety of the perimeter of interior end 4420 of weight member 51400. In this example, chamfer transition 54425 also extends across an entirety of the perimeter of interior end 54420 of weight member 51400. There can be other embodiments, however, where malleable lip 51311 can be subdivide into several separate lips, which could each fold over respective portions of the perimeter of interior end 54420 of weight member 51400. There can also be other embodiments where chamfer transition 54425 could be entirely or partially absent from weight member 51400, such that malleable lip 51311 would fold directly over part of interior end surface 54421 of weight member 51400 when pushed and deformed by press 55500.

In the present embodiment of FIG. 26, shell portion 51300 is shown pressed by press 55500 against die 55600, where die 55600 is configured to shape shell exterior 51320 of shell portion 51300 to a predetermined shape. The predetermined shape imparted to shell exterior 51320 by die 55600 can be configured to match a contour of head body 51100, and/or to align a perimeter of shell portion 51300 for proper bonding with perimeter 52191 (FIGS. 23-24) of body opening 51190 (FIGS. 23-24). In some examples, press 55500 can comprise a 60-120 ton press. In the same or other examples, shell exterior 51320 can be shaped to its predetermined shape against die 55600 concurrently as press 55500 compresses malleable lip 51311 against weight member 51400.

Weight member 51400 can be configured to remain substantially undeformed in the present embodiment when malleable lip 51311 of bracket 51310 is pushed against it by press 55500. In some examples, the chamfer transition 54425 can permit better distribution of compression stresses from press 55500 as malleable lip 51131 is compressed over interior end 54420 of weight member 51400. In the same or other examples, the structure and/or density of the material of weight member 51400 is resilient enough to withstand deformation and/or structural degradation from press 55500, where such strength characteristics would not be otherwise possible if weight member 51400 were limited to comprising instead a weaker or less dense alloy suitable for welding or brazing to body 51100 (FIG. 22).

Because of the use of bracket 51310 and shell portion 51300, weight member 51400 can have a high density notwithstanding its weld-averse characteristics with respect to the material of body 51100. Such high density can permit a volume and thickness 51490 (FIG. 25) of weight member 51400 to be minimized for more precise location and adjustment of one or more characteristics of golf club head 51000.

In light of the above, in one example, such as for a fairway-wood-type club head similar to golf club head 51000, weight member 51400 can comprise a mass of approximately 25 grams to 125 grams, a volume less than approximately 15 cc, and/or a thickness less than of approximately 6.4 mm. In such an example, the golf club head 51000 can comprise a volume of approximately 110 cc to approximately 250 cc, and/or a mass of approximately 200 grams to approximately 240 grams. Additionally, for such examples, weight member 51400 can comprise a weight mass of at least approximately 9.5% of the mass of golf club head 51000, and/or a weight volume of at most approximately 14% of the volume of golf club head 51000.

In another example, such as for a driver-type club head otherwise similar to golf club head 51000, a weight member similar to weight member 51400 can comprise a mass of approximately 15 grams to 60 grams, a volume less than approximately 12 cc, and/or a thickness less than of approximately 5.5 mm. In such an example, the golf club head 51000 can comprise a volume of approximately 300 cc to approximately 600 cc, and/or a mass or approximately 170 grams to approximately 230 grams. Additionally, for such examples, the weight member can comprise a weight mass of at least approximately 3% of the mass of golf club head 51000, and/or a weight volume of at most approximately 5% of the volume of golf club head 51000.

In another example, such as for a hybrid-type club head otherwise similar to golf club head 51000, a weight member similar to weight member 51400 can comprise a mass of approximately 30 grams to 140 grams, a volume less than approximately 20 cc, and/or a thickness less than of approximately 8.5 mm. In such an example, the golf club head 51000 can comprise a volume of approximately 70 cc to approximately 200 cc, and/or a mass or approximately 210 grams to approximately 260 grams. Additionally, for such examples, the weight member can comprise a weight mass of at least approximately 12% of the mass of golf club head 51000, and/or a weight volume of at most approximately 30% of the volume of golf club head 51000.

Considering the above and returning to FIG. 22, because the thickness and/or volume of weight member 51400 is minimized, compared with another weight member made of a less dense material or alloy, more of the mass of weight member 51400 will be closer to shell exterior 51320 of shell portion 51300, thereby permitting greater adjustment of a center of gravity of golf club head 51000 than would be possible with a weldable but less dense weight member.

In one example, such as for a fairway-wood-type club head similar to golf club head 51000, center of gravity 51510 of golf club head 51000 can be adjusted by weight member 51400, from non-adjusted center of gravity location 51511 to adjusted center of gravity location 51512, by approximately 0.38 mm to approximately 0.9 mm towards sole portion 51110. Center of gravity 51510 can is also adjusted towards front portion 51130 in the present example, where such adjustment can enhance the launch characteristics of the fairway-wood-type club head by reducing the amount of clubhead rotation that takes place during the impact with a golf ball. By reducing the clubhead rotation, more of the kinetic energy of the club can be transferred to the golf ball, which can lead to higher ball velocity and reduced backspin for increased distance and/or accuracy.

In another example, such as for a driver-type club head otherwise similar to golf club head 51000, the center of gravity of the driver-type club head can be adjusted towards its sole by weight member 51400 by approximately 0.25 mm to approximately 0.80 mm. In another example, such as for a hybrid-type club head otherwise similar to golf club head 51000 (FIG. 22), the center of gravity of the hybrid-type club head can be adjusted towards its sole by weight member 51400 by approximately 0.40 mm to approximately 1.2 mm.

Although in the present example shell portion 51300 and weight member 51400 are shown in FIGS. 22-23 located towards sole portion 51110 and front portion 51130 of head body 51100, there can be other embodiments where shell portion 51300 and weight member 51400 could be located towards other portions of head body 51100, such as towards crown portion 51120, rear portion 51140, and/or skirt portion 52150 depending on the feature or characteristic of golf club head 51000 desired to be adjusted. In addition, although shell portion 51300 is shown as comprising a portion of sole portion 51110, there can be other embodiments where shell portion 51300 comprises substantially all, and/or an entirety of, sole portion 51110. Furthermore, although weight member 51400 (FIGS. 22-23, 25-26), bracket cavity 54370 (FIG. 25), and shell portion 51300 (FIGS. 22-23, 25-26) are shown as comprising substantially circular shapes, there can be other embodiments where weight member 51400, bracket cavity 54370, and/or shell portion 51300 can comprise other shapes such as rectangular shapes, pentagonal shapes, shield shapes, and/or shapes tailored to conform to a contour of at least part of golf club head 51000.

After weight member 51400 has been secured via malleable lip 51311 to bracket 51310, as described above, shell portion 51300 can be coupled to body opening 51190 to seal interior cavity 51200 of golf club head 51000. For instance, shell portion 51300 can be secured to perimeter 52191 (FIG. 23) of body opening 51190 (FIGS. 22-24) via welding or brazing, such as with weld bead 51610 (FIG. 22). In the present example, for a better bond, weld bead 51610 couples shell portion 51300 to body opening 51190 throughout a total thickness of the perimeter of shell portion 51300 (FIGS. 22-23) at body opening 51190.

In the present example, bracket 51310 and shell portion 51300 can comprise the same material, both being cast, forged, or otherwise formed from a single piece of the same material. Also in the present example, shell portion 51300 can comprises the same material as used to form perimeter 52191 (FIG. 23) of body opening 51190, such as a titanium material, a steel material, and/or a zirconium material. Accordingly, shell portion 51300 can be readily welded or brazed to perimeter 52191 of body opening 51190. There also can be examples where shell portion 51300 can comprise a material with a density greater than the density of head body 51100, such as a tungsten alloy with a specific gravity approximately 10 to 12, configured to be welded or brazed to perimeter 52191 (FIG. 23) of body opening 51190.

B. Multi-Density Weight Comprising Two Shell Sheets and a Weight Member

Figure 27:
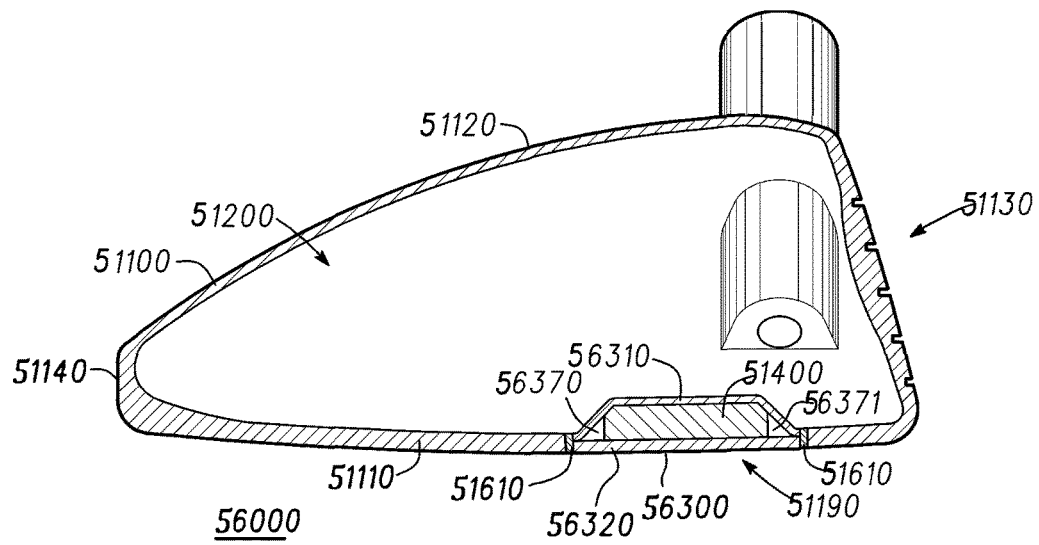
FIG. 27 illustrates a side cross-sectional view of a golf club head with a weighted shell portion coupled thereto.

Continuing with the figures, FIG. 27 illustrates a side cross-sectional view of golf club head 56000. Golf club head 56000 can be similar to golf club head 51000 (FIGS. 22-24), but comprises shell portion 56300 instead of shell portion 51300 (FIGS. 1-2, 4-5). Shell portion 56300 can be similar to shell portion 51300. For example shell portion 56300 can comprise dimensions similar to those shown or described with respect to shell portion 51300 (FIGS. 22-23, 25-26). In addition, shell portion 56300 can be located to comprise at least a portion of, and/or an entirety of, one or more portions of head body 51100, such as sole portion 51110, crown portion 51120, front portion 51130, rear portion 51140, and/or the skirt portion.

Shell portion 56300 differs from shell portion 51300, however, with respect to the way weight member 51400 couples to shell portion 56300. Whereas shell portion 51300 relied on bracket 51310 and malleable lip 51311 to secure weight member 51400 in FIGS. 22-26, shell portion 56300 comprises weight member 51400 encapsulated between shell sheet 56310 and shell sheet 56320. In the present example, shell portion 56300 comprises: (a) shell sheet 56310 having a side thereof facing interior cavity 51200, and (b) shell sheet 56320 opposite shell sheet 56310 and having a side thereof facing towards an exterior of shell portion 56300, where capsule 56370 is defined between shell sheets 56310 and 56320 to contain weight member 51400. The density of weight member 51400 is greater than the density of either of shell sheets 56310 and 56320 of shell portion 56300.

Figure 28:
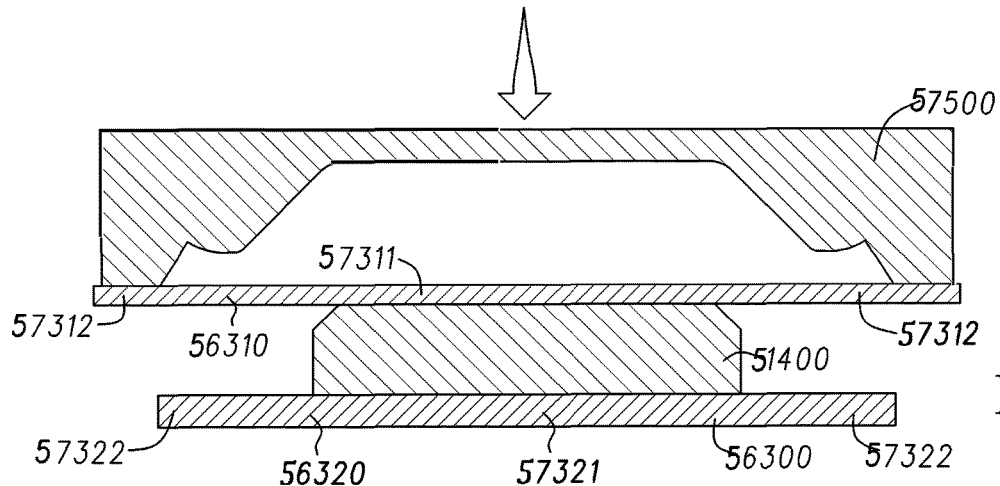
FIG. 28 illustrates a side cross-sectional view of the weight member prior to encapsulation within the shell portion of FIG. 27.
Figure 29:
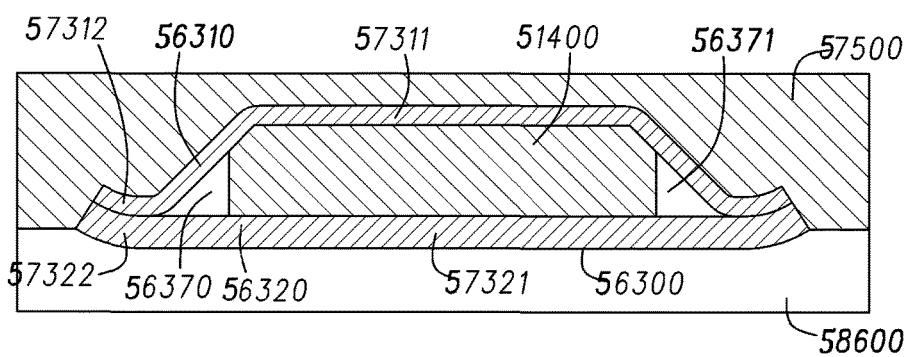
FIG. 29 illustrates a side cross-sectional view of the weight member after encapsulation within the shell portion of FIG. 27.

FIG. 28 illustrates a side cross-sectional view of weight member 51400 prior to encapsulation within shell portion 56300. FIG. 29 illustrates a side cross-sectional view of weight member 51400 after encapsulation within shell portion 56300 by press 57500 and die 58500. Shell sheet 56310 comprises shell sheet capsule section 57311 defining a portion of capsule 56370, and shell sheet periphery section 57312 bounding shell sheet capsule section 57311. Shell sheet 56320 comprises shell sheet capsule section 57321 defining a portion of capsule 56370, and shell sheet periphery section 57322 bounding shell sheet capsule section 57321. When shell sheets 56310 and 56320 are pressed against each other by press 57500 to encapsulate weight member 51400, shell sheet capsule section 57311 of shell sheet 56310 is stamped over weight member 51400 to conform to a shape thereof. As a result, capsule 56370 is thus defined and bounded between shell sheet capsule sections 57311 and 57321, and shell sheet periphery sections 57321 and 57322 are brought together to seal weight member 51400 within capsule 56370, where shell sheet periphery section 57312 conforms to shell sheet periphery section 57322 in the present example. In some examples, weight member 51400 can be configured to remain substantially undeformed when shell sheet 65310 is stamped over it. As can be seen in FIGS. 27 and 29, shell sheets 56310 and/or 56320 need not completely conform to the shape of weight member 51400, and one or more capsule voids 56371 can remain within capsule 56373 after weight member 51400 is securely encapsulated therein. There can be other examples, however, where weight member 51400 can be configured to deform when shell sheet 56310 is stamped over weight member 51400, so that shell sheet 56310 can better conform to the shape of weight member 51400 and/or to minimize the volume of one or more of capsule voids 56371.

Die 58600 (FIG. 29) is similar to die 55600 (FIG. 26), and is configured to impart a predetermined shape to the exterior of shell sheet 56320, similar to the predetermined shape described above for shell exterior 51320 (FIG. 26), when shell portion 56300 is pressed between press 57500 and die 58600 (FIG. 29). In other examples, however, shell sheets 56310 and/or 56320 may be separately pre-shaped prior to being coupled together, and could then be brought together around weight member 51400 without press 57500.

Once cavity 56370 has been defined around weight member 51400, shell sheet periphery sections 57312 and 57322 can be secured to each other if desired, such as by spot-welding, prior to coupling shell portion 51300 to body opening 51190. In addition, because the shape of capsule 56370 between shell sheets 56310 and 56311 conforms to the shape of weight member 51400, weight member 51400 can thus be secured to shell portion 56300 without having to rely on welding, brazing, screws, rivets, or adhesives. In this present example, weight member 51400 is coupled or secured to shell portion 56300 only by using shell portion 56300 itself (and optionally, spot welding, etc. for shell portion 56300).

With weight member 51400 encapsulated within cavity 56370 between shell sheets 56310 and 56320 as described above, shell portion 56300 can be coupled to body opening 51190 of head body 51100 as seen in FIG. 27, and as described above with respect to shell portion 51300 (FIGS. 22-24). In some examples, if welding or brazing shell portion 56300 to body opening 51190, such as via weld bead 51610, a total thickness of the perimeter of each of shell sheets 56310 and 56320 can be welded or brazed to the perimeter of body opening 51190 for a better bond and/or to further secure shell sheet periphery sections 57312 and 57322 to each other. Once shell portion 56300 is secured to body opening 51190, shell sheet 56310, weight member

51400, and capsule 56370 can be fully internal to interior cavity 51200 of golf club head 56000 in the present embodiment.

In some examples, the material, mass, thickness, and/or volume for weight member 51400 as used in the embodiment of FIGS. 27-30 can be similar to one or more of those described above with respect to the embodiment of FIGS. 22-26. In the same or other examples, the material(s) of shell sheets 56310 and/or 56320 of shell portion 56300 can be similar to those described above with respect to shell portion 51300 (FIGS. 22-23, 25-26).

In the same or other examples, a center of gravity of golf club head 56000 may be adjusted by weight member 51400 and/or shell portion 56300 as described above with respect to the center of gravity 51510 of golf club head 51000 (FIG. 22). The mass, volume, and thickness ranges described earlier for golf club head 51000 (FIG. 22) can also apply here to golf club head 56000.

Shell sheets 56310 and 56320 may comprise the same materials or different materials, depending on the embodiment. For instance, the material(s) for shell sheets 56310 and/or 56320 can comprise steel, titanium, zirconium, alloys thereof, and/or other weldable alloys such as a weldable tungsten nickel alloy. In some examples, to better conform to the shape of weight member 51400 when pressed by press 57500 (FIG. 28), shell sheet 56310 may be configured to comprise greater deformability than shell sheet 56320. For instance, the material of shell sheet 56310 can be less dense, more ductile, and/or more malleable than the material of shell sheet 56320. In the same or other embodiments, the thickness of shell sheet 56310 can be configured to be less than the thickness of shell sheet 56320 to better conform to the shape of weight member 51400. The thickness of shell sheet 56310 and/or shell sheet 56320 can be of at least approximately 4.5 mm in some implementations to permit proper welding via weld bead 51610.

Figure 30:
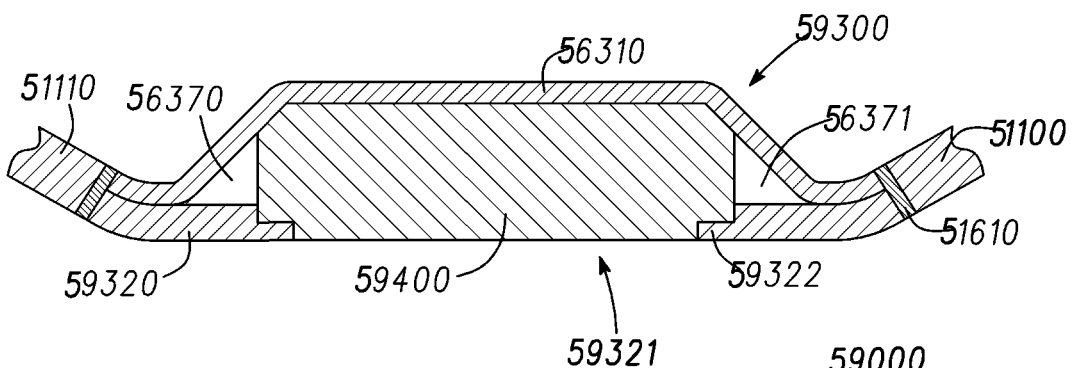
FIG. 30 illustrates a portion of a golf club head comprising a weighted shell portion coupled thereto.

C. Multi-Density Weight Comprising Two Shell Sheets with a Passageway and a Weight Member There can also be other embodiments where, after encapsulation, weight member 51400 could still be not fully enclosed within shell portion 56300, and or where weight member 51400 can still be visible from an exterior of golf club head 56000. As an example, FIG. 30 illustrates a portion of golf club head 59000 comprising body 51100 and shell portion 59300 coupled thereto along with encapsulated weight member 59400. Shell portion 59300 can be similar to shell portion 51300 (FIGS. 25-26) and/or to shell portion 56300 (FIGS. 27-29), but comprises passageway or port hole 59321 at shell sheet 59320 through which weight member 59400 can be seen from an exterior of golf club head 59000. In the present example, weight member 59400 is similar to weight member 51400 (FIGS. 22, 25-29), and shell sheet 59320 comprises lip 59322 to prevent weight member 59400 from dislodging from capsule 56370 through port hole 59321. Weight member 59400 also occupies at least a portion of the volume of port hole 59321 in the present example, where port hole 59321 thereby permits more of the dense material of weight member 59400 to be closer to the exterior of shell portion 59300 for greater adjustment of the center of gravity or other characteristics of golf club head 59000. Again, no welding, brazing, screws, rivets, or adhesives are used to couple or secure weight member 59400 to shell portion 59300. In this present example, weight member 59400 is coupled or secured to shell portion 59300 only by using shell portion 59300 itself (and optionally, spot welding, etc. for shell portion 59300).

Figure 31:
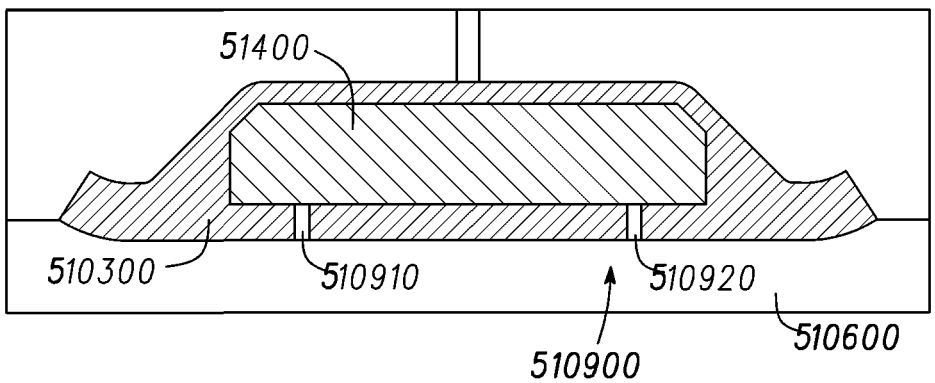
FIG. 31 illustrates a side cross-sectional view of a weight member encapsulated within a cast shell portion.

In another embodiment, FIG. 31 illustrates a side cross-sectional view of weight member 51400 encapsulated within shell portion 510300. Shell portion 510300 can be similar to one or more of shell portion 51300 (FIGS. 22-23, 25-26), shell portion 56300 (FIGS. 27-29), and/or shell portion 59300 (FIG. 30). In the present example, however, shell portion 510300 is configured to be cast within mold 510600, where the material of shell portion 510300 can be introduced in liquid form to encapsulate and conform once hardened as a single piece of material to the shape of weight member 51400 therewithin. Weight member 51400 can be held in place within mold 510600 by one or more stands 510900, such as stands 510910 and 510920, while the material of shell portion 510300 hardens. In some examples, the one or more stands 510900 can be part of, or protrude from, weight member 51400 or mold 510600. Again, no welding, brazing, screws, rivets, or adhesives are used to couple or secure weight member 51400 to shell portion 510300. In this present example, weight member 51400 is coupled or secured to shell portion 510300 only by using shell portion 510300 itself.

Figure 32:
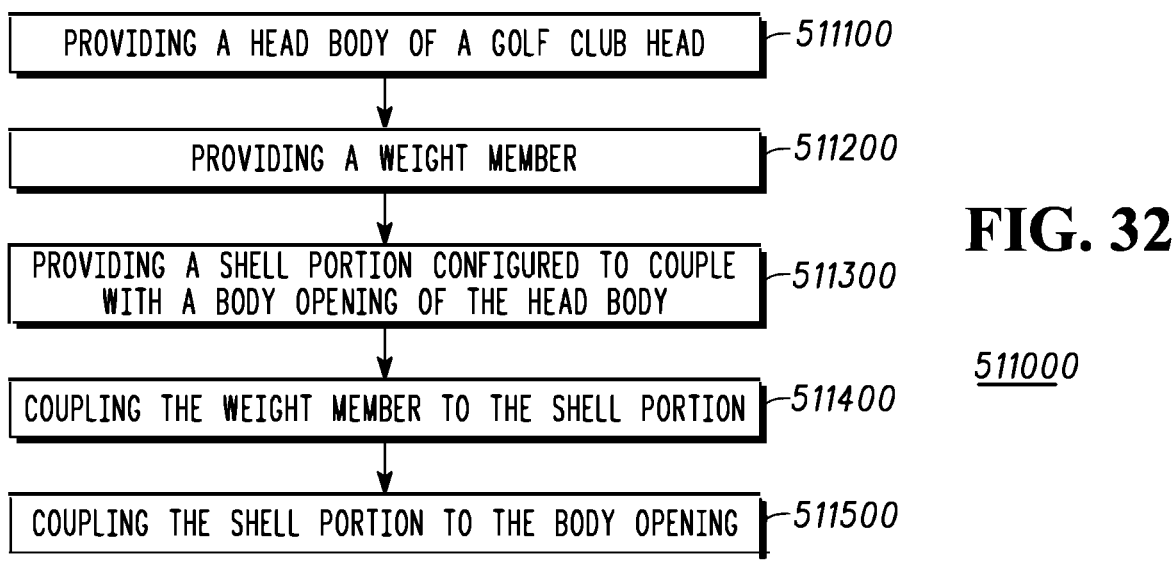
FIG. 32 illustrates a flowchart for a method which can be used to provide, form, and/or manufacture a golf club head with a weighted shell portion.

D. Method of Forming a Multi-Density Weight Comprising a Shell Portion and a Weight Member Moving on, FIG. 32 illustrates a flowchart for a method 511000, which can be used to provide, form, and/or manufacture a golf club head with a weighted shell portion in accordance with the present disclosure. In some examples, the golf club head can be similar to one or more of the golf club heads described herein. The weighted shell portion can be similar to one or more of the shell portions described herein, such as shell portion 51300 (FIGS. 22-23, 25-26), shell portion 56300 (FIGS. 27-29), shell portion 59300 (FIG. 30), and/or shell portion 510300 (FIG. 31).

Method 511000 comprises block 511100 for providing a head body of the golf club head. In some examples, the head body can be similar to a head body of one of the embodiments described above, such as head body 1100 (FIGS. 22-24, 27, 30). Although, in the figures above, head body 51100 is illustrated as a fairway-wood type golf club head body, the disclosure herein is not limited in that respect. For example, the head body could comprise a driver-type head body, a hybrid-type head body, an iron-type or wedge-type head body, or a putter-type head body in some implementations.

Block 511200 of method 511000 comprises providing a weight member. In some examples, the weight member can be similar to weight member 51400 as described above with respect to the embodiments of FIGS. 22-29 and 31, to weight member 59400 in the embodiment of FIG. 30, and/or to other similar weight members. The density of the weight member can be configured to be greater than the density of any other portion of the golf club head. In some examples, the weight member can comprise a material similar to those described above for weight member 51400, with a density greater than approximately 14. For instance, the weight member can comprise a material with a specific gravity of approximately 18 to approximately 20.

Block 511300 of method 511000 comprises providing a shell portion configured to couple with a body opening of the head body. In some examples, the shell portion can be similar to one or more of the shell portions described above, such as shell portion 51300 (FIGS. 22-23, 25-26), shell portion 56300 (FIGS. 27-29), shell portion 59300 (FIG. 30), and/or shell portion 510300 (FIG. 31). The shell portion can be configured to couple the weight member of block 511200 to the head body of block 511100. Blocks 511100, 511200, and 511300 can be performed in any sequence and/or simultaneously with each other.

In some embodiments, the shell portion can be similar to shell portion 51300 (FIGS. 22-23, 25-26), comprising an interior side configured to face an interior cavity of the head body, such as cavity 51200 of head body 51100 (FIG. 22). A bracket with a malleable lip, which can be similar to bracket 51310 with malleable lip 51311 (FIGS. 22, 25-26), can be provided coupled to the interior side of the shell portion. The shell portion and the bracket may comprise a single piece of the same material, and/or may be formed concurrently in some embodiments. In another embodiment, the shell portion can be similar to shell portion 56300 (FIGS. 27-29) and/or shell portion 59300 (FIG. 30), comprising a first shell sheet similar to shell sheet 56310 configured to face the interior cavity of the shell body, and a second shell sheet similar to shell sheet 56320 (FIG. 27) or shell sheet 59320 (FIG. 30), where the first and second shell sheets can be configured to define a capsule therebetween to contain the weight member of block 511200. In another embodiment, the shell portion, such as shell portion 510300 (FIG. 31), can be provided to be cast around the weight member of block 511200.

Next, block 511400 of method 511000 comprises coupling the weight member to the shell portion. In some examples, the weight member can be coupled to the shell portion as described above for one or more of the embodiments described with respect to FIGS. 22-31. In some examples, the shell portion can comprise a material similar to those described above with respect to shell portion 51300 (FIGS. 22-23, 25-26), to which the material of the weight member of block 511200 would be hard to reliably weld or braze. Accordingly, the shell portion can be configured to secure the weight member to the shell portion by welding or brazing the weight member. In addition, in the same or other examples, the weight member can be secured to the shell portion in a non-screwed, non-riveted, and non-adhesive manner for better reliability, durability, and resistance to impact stresses.

For instance, the weight member can be coupled to the shell portion by inserting the weight member into a bracket similar to bracket 51310 (FIGS. 22, 25-26), and can be secured thereto by compressing a malleable lip against an interior end of the weight member, similar to malleable lip 51311 as compressed against the interior end 54420 of weight member 51400 described above with respect to FIGS. 22-26.

In another example, the weight member can be coupled to the shell portion by encapsulation between two shell sheets, such as shell sheets 56310 and 56320 (FIGS. 27-29), or such as shell sheets 56310 and 59320 (FIG. 30). In the same or other examples, such encapsulation can be made by compressing and/or stamping the shell sheets against the weight member using a press and/or a die similar to press 57500 and/or die 58600 (FIGS. 28-29). There also can be other examples where one or more of the shell sheets can be pre-stamped or pre-formed with respect to the shape of the weight member prior to being coupled together to encapsulate the weight member. In another example, the weight member can be coupled to the shell portion by casting the material of the shell portion in liquid form around the weight member using a mold, and then hardening the material of the shell portion to encapsulate the weight member, as described above with respect to FIG. 31.

Next, block 511500 of method 511000 comprises coupling the shell portion of block 511300 to a body opening of the head body of block 511100. In some embodiments, the body opening of the head body can be similar to body opening 51190 (FIGS. 22, 24) of head body 51100, but there can be other embodiments where the body opening can be located elsewhere besides at the sole of the golf club head, such as towards a crown portion, a rear portion, and/or a front portion of the golf club head. In the same or other embodiments, the shell portion can be secured to a perimeter of the body opening by welding or brazing, as described above with respect to the coupling of one or more of the shell portions described in FIGS. 22-31 to perimeter 52191 of body opening 51190 (FIGS. 23-24). Although in some examples a material of the shell portion of block 511300 can be the same as that of the head body of block 511100 at the perimeter of the body opening thereof, there can be other embodiments where the material of the shell portion can be more dense than the material of the head body while still remaining weldable or brazeable thereto. In some embodiments, a shell exterior of the shell portion can be configured, via a die, a mold, or other suitable mechanism, to match a contour of the head body when coupled thereto in block 511500.

Because of the high density of the weight member of block 511200 permitted by the use of the shell portion of block 511300, a mass of the weight member can be maximized while minimizing the volume or thickness of the weight member for more precise location and dramatic adjustment of a center of gravity or other characteristics of the golf club head of method 511000. In some examples, the mass and volume relationships between the weight member of block 511200 and the golf club head of method 511000 can be similar to those described above with respect to weight member 51400 and the golf club heads of FIGS. 22-31). In addition, the location of the center of gravity of the golf club head of method 511000 can be adjusted by the weight member of block 511200 similar to the adjustments described above for the golf club heads of FIGS. 22-31 by weight members 51400 and 59400.

In some examples, one or more of the different blocks of method 511000 can be combined into a single block or performed simultaneously, and/or the sequence of such blocks can be changed. For example, in some embodiments, two or more of blocks 511100, 511200, or 511300 may be combined if desired. In the same or other examples, some of the blocks of method 511000 can be subdivided into several sub-blocks. As an example, block 511100 may be subdivided with respect to providing and/or coupling together several portions of the head body, such as for coupling a face plate to the front portion of the head body. There can also be examples where method 511000 can comprise further or different blocks. As an example, method 511000 may comprise another block for polishing the junction between the shell portion and the body opening to conform to an external contour of the golf club head.

In addition, there may be examples where method 511000 can comprise only part of the steps described above. For instance, method 511000 may comprise only blocks 511200-511400, without having to provide the head body in block 511100 and without having to provide the golf club head in completed form. Other variations can be implemented for method 511000 without departing from the scope of the present disclosure.

Although the golf club weight attachment mechanisms and related methods herein have been described with reference to specific embodiments, various changes may be made without departing from the spirit or scope of the present disclosure. As an example, there may be embodiments where the weight attachment mechanisms described herein can be implemented in iron-type, wedge-type, and/or putter-type golf club heads having an interior cavity configured to accommodate a shell portion and a weight member similar to those described herein. Additional examples of such changes and others have been given in the foregoing description. Other permutations of the different embodiments having one or more of the features of the various figures are likewise contemplated. Accordingly, the specification, claims, and drawings herein are intended to be illustrative of the scope of the disclosure and is not intended to be limiting. It is intended that the scope of this application shall be limited only to the extent required by the appended claims.

The golf club weight attachment mechanisms and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described mostly in connection with fairway-wood type golf club heads, the apparatus, methods, and articles of manufacture described herein may be applicable to other types of golf club such as a driver-type golf club, an iron-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Clauses

Clause 1. A golf club head comprising: a body comprising a receptacle; a multi-density weight comprising: a first weight component comprising a first density; and a second weight component comprising a second density greater than the first density; wherein: the first weight component is configured to receive the second weight component; the multi-density weight is configured to couple to with the receptacle; the first weight component comprises a tungsten alloy; the second weight component comprises a tungsten alloy having a weld-averse trait with respect to the body; the second weight component is at least partially bounded by the first weight component; and a thickness of the first weight component around the second weight component is at least 0.075 inches.

Clause 2. The golf club head of clause 1, wherein the second weight component is coupled to the first weight component with a swedged bond.

Clause 3. The golf club head of clause 1, wherein the multi-density weight is coupled to the receptacle of the body with a weld bond.

Clause 4. The golf club head of clause 1, wherein the multi-density weight is coupled to the receptacle of the body with a brazed bond.

Clause 5. The golf club head of clause 1, wherein the second weight component comprises greater than 70% of a total volume of the multi-density weight.

Clause 6. The golf club head of clause 1, wherein the multi-density weight forms a portion of a backside of the body.

Clause 7. The golf club head of clause 1, wherein the multi-density weight forms portion of a backside and a toe region of the body.

Clause 8. The golf club head of clause 1, wherein the multi-density weight forms a portion of a backside, a toe region, and a sole region of the body.

Clause 9. The golf club head of clause 1, wherein the multi-density weight forms a portion sole region and a toe region of the body.

Clause 10. The golf club head of clause 1, wherein the first weight component comprises a density of less than 13 $g/cm^3$ and the second weight component comprises a density of greater than 11 $g/cm^3$.

Clause 11. A golf club head comprising: a body comprising a receptacle; a multi-density weight comprising: a first weight component comprising a first density; and a second weight component comprising a second density greater than the first density; wherein: the first weight component is configured to receive the second weight component; the multi-density weight is configured to couple to with the receptacle; the first weight component comprises a tungsten alloy; the second weight component comprises a tungsten alloy having a weld-averse trait with respect to the body; the first weight component partially bounds the second weight component; a thickness of the first weight component around the second weight component is at least 0.075 inches; and the multi-density weight forms a portion sole region and a toe region of the body.

Clause 12. The golf club head of clause 11, wherein the second weight component is coupled to the first weight component with a swedged bond.

Clause 13. The golf club head of clause 11, wherein the multi-density weight is coupled to the receptacle of the body with a weld bond.

Clause 14. The golf club head of clause 11, wherein the multi-density weight is coupled to the receptacle of the body with a brazed bond.

Clause 15. The golf club head of clause 11, wherein the second weight component comprises greater than 70% of a total volume of the multi-density weight.

Clause 16. The golf club head of clause 11, wherein the first weight component completely bounds the second weight component.

Clause 17. The golf club head of clause 11, wherein the multi-density weight forms portion of a backside and a toe region of the body.

Clause 18. The golf club head of clause 11, wherein the multi-density weight forms a portion of a backside, a toe region, and a sole region of the body.

Clause 19. The golf club head of clause 11, wherein the first weight component comprises a density of less than 13 g/cm$^3$ and the second weight component comprises a density of greater than 11 g/cm$^3$.

Clause 20. The golf club head of clause 11, wherein the first weight component completely bounds the second weight component.

The invention claimed is:

1. A golf club head comprising:
 a body and a multi-density weight;
  wherein the body comprises a heel region, a toe region opposite the heel region, a sole region, and a rear region;
  wherein the body further comprises a receptacle, wherein the receptacle is formed by a receptacle base, a receptacle heel side wall, and a receptacle top wall;
  wherein the receptacle comprises at least 60% of the rear region of the club head body;
  wherein the receptacle base extends an entire length of the club head body in a heel to toe direction;
  wherein the multi-density weight comprises a first weight component comprising a first density; and a second weight component comprising a second density greater than the first density;
  wherein the first weight component comprises a top surface, a base, a top wall, a bottom wall, a sole wall, a toe side wall, and a heel side wall;
  wherein the second weight component is enclosed within the first weight component;
  wherein the first weight component completely bounds the second weight component;
  wherein the first weight component comprises a tungsten alloy; and
  wherein the receptacle base, the receptacle heel side wall, and the receptacle top wall are configured to secure the multi-density weight within the club head body.

2. The golf club head of claim 1, wherein:
 the top wall of the multi-density weight is configured to abut with the receptacle top wall;
 the bottom wall of the multi-density weight is configured to abut with the receptacle base;
 the sole wall is configured to form a portion of the sole region of the club head body;
 the toe side wall of the multi-density weight is configured to form a portion of the toe region of the club head body; and
 the heel side wall of the multi-density weight is configured to abut with the heel side wall of the receptacle.

3. The golf club head of claim 2, wherein the first weight component is welded, to the receptacle top wall, the receptacle base, and the receptacle heel side wall.

4. The golf club head of claim 1, wherein:
 the receptacle follows a contour of the toe region, the sole region, and the rear region; and
 the receptacle forms more of the rear region and the sole region than the toe region.

5. The golf club head of claim 1, wherein the first weight component and the second weight component are coupled at a single surface via a brazed bond.

6. The golf club head of claim 1, wherein the first weight component and the second weight component are coupled at a single surface via weld bond.

7. The golf club head of claim 1, wherein:
 the top surface of the multi-density weight is visible when inserted in the receptacle; and
 the base of the multi-density weight is coupled or abutted against the receptacle base and not visible when inserted into the receptacle.

8. The golf club head of claim 1, wherein the receptacle further comprises barbing elements configured to interlock with the multi-density weight when the multi-density weight is swedged in the receptacle.

9. The golf club head of claim 1, wherein the multi-density weight entirely fills the receptacle.

10. The golf club head of claim 1, wherein the multi-density weight partially fills the receptacle.

11. A golf club head comprising:
 a body and a multi-density weight;
  wherein the body comprises a heel region, a toe region opposite the heel region, a sole region, and a rear region;
  wherein the body further comprises a receptacle, wherein the receptacle is formed by a receptacle base, and a receptacle top wall;
  wherein the receptacle comprises at least 70% of the rear region of the club head body;
  wherein the receptacle follows a contour of the toe region, the heel region, the sole region, and the rear region;
  wherein the receptacle base extends an entire length of the club head body in a heel to toe direction;
  wherein the multi-density weight comprises a first weight component comprising a first density; and a second weight component comprising a second density greater than the first density;
  wherein the first weight component comprises a top surface, a base, a top wall, a bottom wall, a sole wall, a toe side wall, and a heel side wall;
  wherein the second weight component is enclosed within the first weight component;
  wherein the first weight component completely bounds the second weight component;
  wherein the first weight component comprises a tungsten alloy; and
  wherein the receptacle base, and the receptacle top wall are configured to secure the multi-density weight within the club head body.

12. The golf club head of claim 11, wherein the first weight component and the second weight component are coupled at a single surface via a brazed bond.

13. The golf club head of claim 11, wherein the first weight component and the second weight component are coupled at a single surface via a weld bond.

14. The golf club head of claim 11, wherein the top surface of the multi-density weight is visible when inserted in the receptacle.

15. The golf club head of claim 11, wherein the multi-density weight further comprises a geometry complementary to a geometry of the receptacle.

16. The golf club head of claim 11, wherein the multi-density weight entirely fills the receptacle.

17. The golf club head of claim 11, wherein the multi-density weight partially fills the receptacle.

18. The golf club head of claim 11, wherein an entirety of the rear region comprises the multi-density weight.

19. The golf club head of claim 11, wherein the body further comprises a strike face, and the body further defines a cavity bounded by the strike face, the heel region, the toe region, the sole region, and the rear region, wherein:
the cavity separates the multi-density weight from the strike face.

* * * * *